(12) United States Patent
Keon

(10) Patent No.: US 8,498,307 B2
(45) Date of Patent: Jul. 30, 2013

(54) CHANNEL ALLOCATION IN PROTECTED SERVICE AREAS

(75) Inventor: Neil Keon, Dallas, TX (US)

(73) Assignee: WSDB LLC, Dallas, TX (US)

( * ) Notice: Subject to any disclaimer, the term of this patent is extended or adjusted under 35 U.S.C. 154(b) by 310 days.

(21) Appl. No.: 12/966,279

(22) Filed: Dec. 13, 2010

(65) Prior Publication Data

US 2011/0164581 A1 Jul. 7, 2011

Related U.S. Application Data

(60) Provisional application No. 61/292,127, filed on Jan. 4, 2010, provisional application No. 61/383,099, filed on Sep. 15, 2010.

(51) Int. Cl.
*H04L 12/28* (2006.01)
(52) U.S. Cl.
USPC .......................................... 370/431; 370/464
(58) Field of Classification Search
USPC ............ 370/363, 368, 378, 379, 382, 395.41, 370/395.42, 431, 464
See application file for complete search history.

(56) References Cited

U.S. PATENT DOCUMENTS

2008/0216133 A1* 9/2008 Vergoossen ..................... 725/86

\* cited by examiner

*Primary Examiner* — Brenda H Pham

(57) ABSTRACT

In described embodiments, a channel allocation system, such as a white space (WS) channel allocation system, employs a method to populate a WS database with channel availability information for areas with protected or otherwise registered service user information server. Communication characteristics of incumbent service providers licensed or otherwise registered to operate within certain frequency spectrum are plotted over a geographic area. The channel allocation system then divides the area into tiles, and determines whether each tile can be characterized for channel availability and, for those tiles that are uncharacterized, further divides the tiles into tiles of finer resolution. Based on information in the WS database, availability of channels in areas is pre-computed, and then an iterative search of areas with successively finer resolution identifies white space channels that might be included in the channel list in response to a query from a unlicensed or unregistered user.

26 Claims, 24 Drawing Sheets

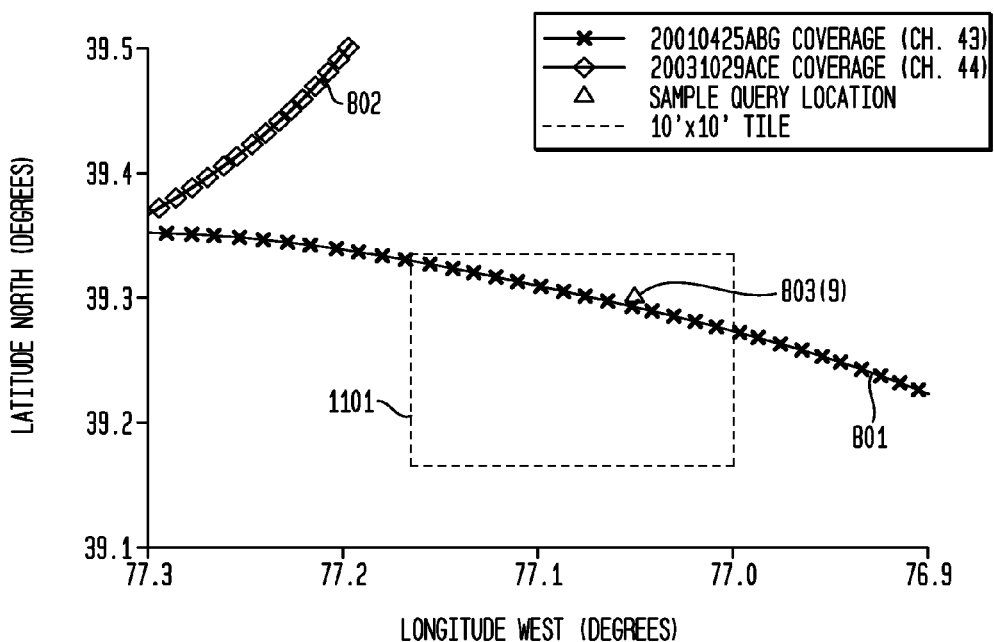
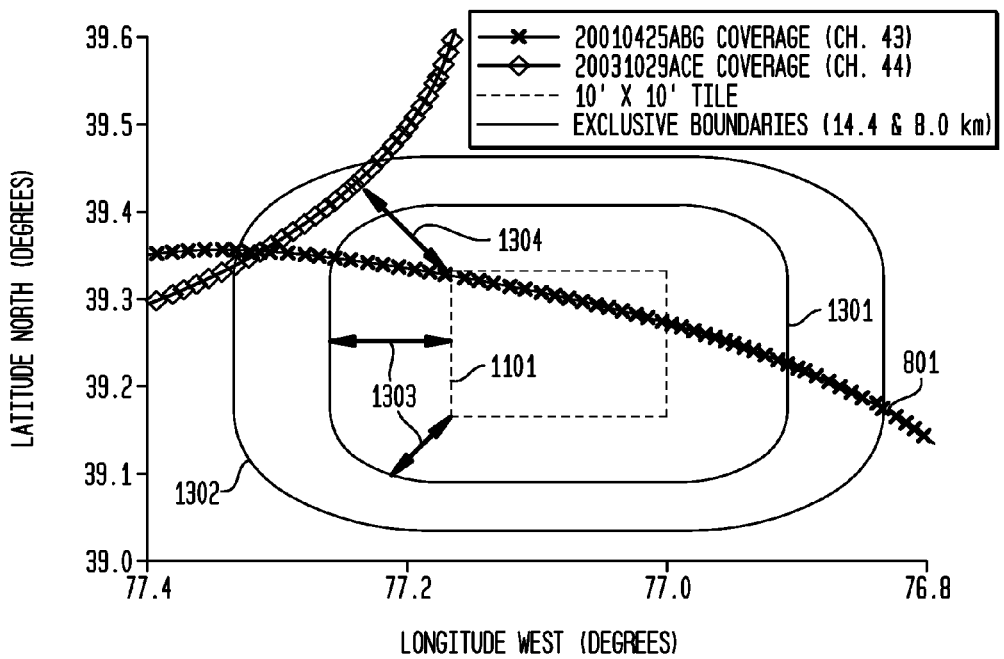

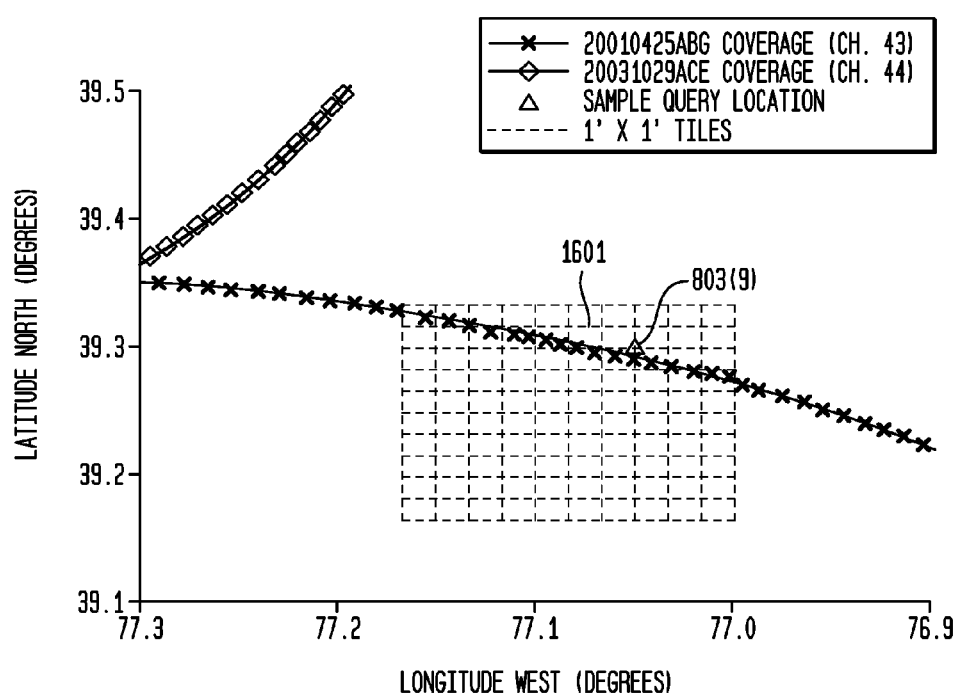

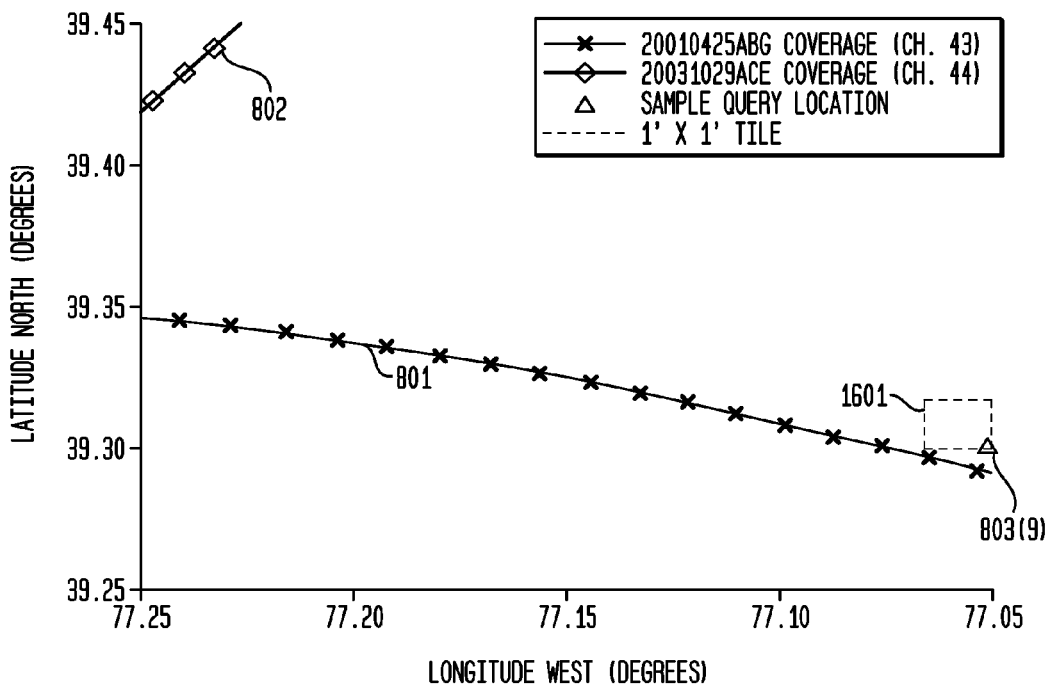
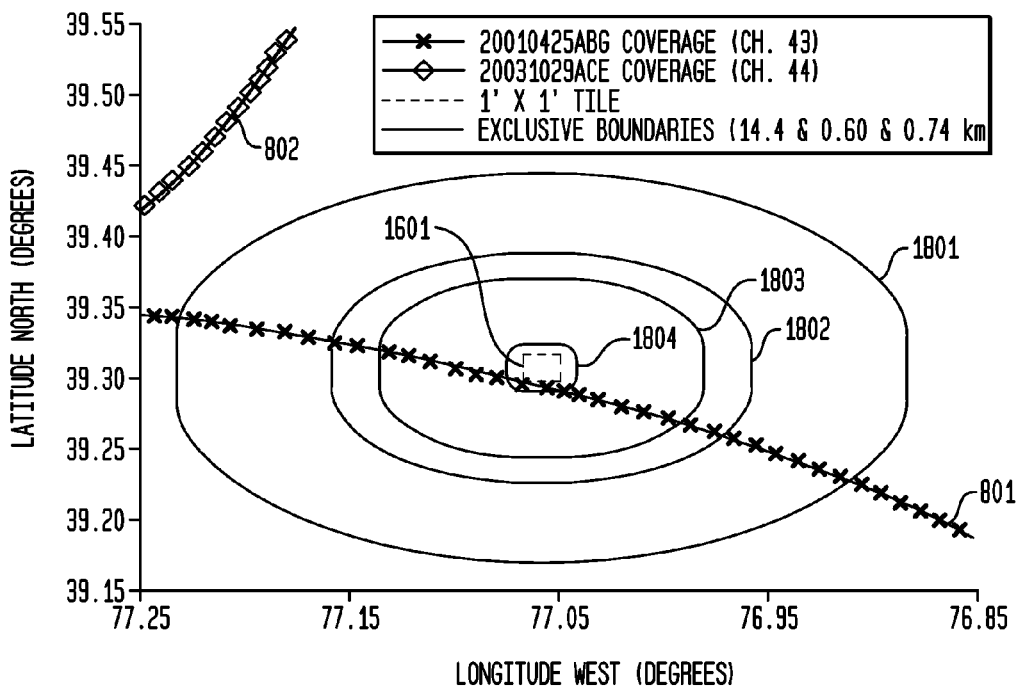

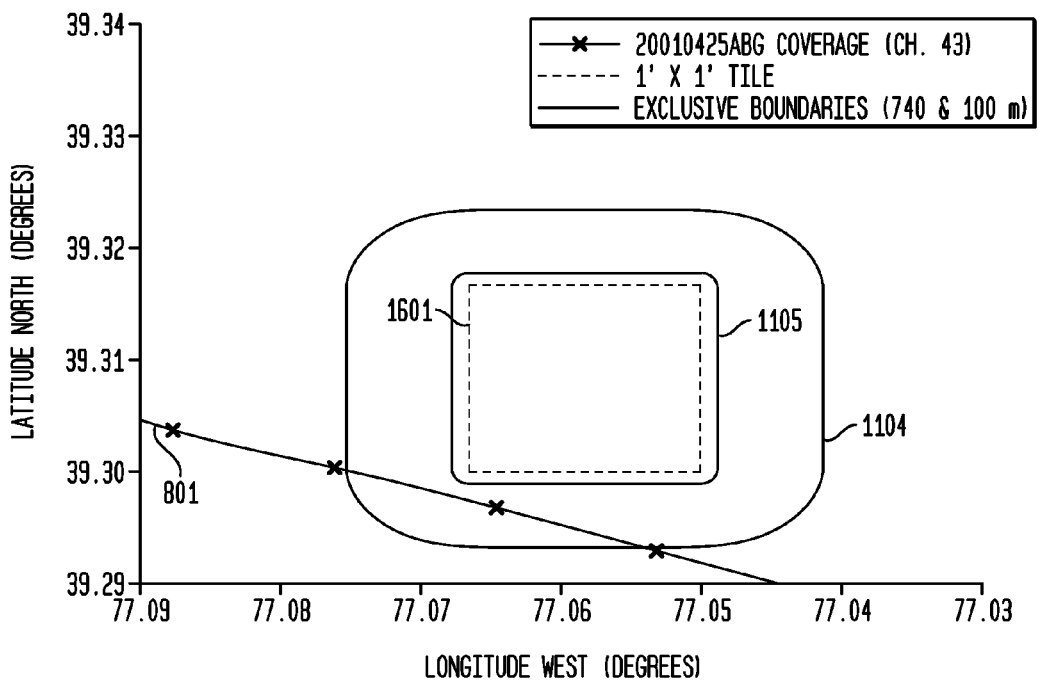
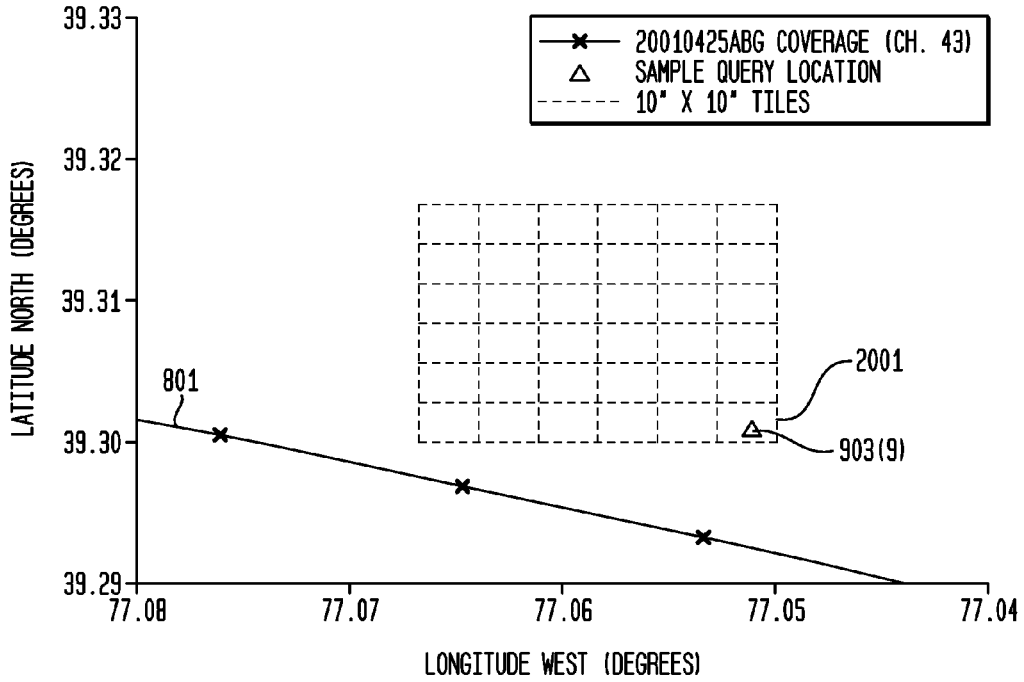

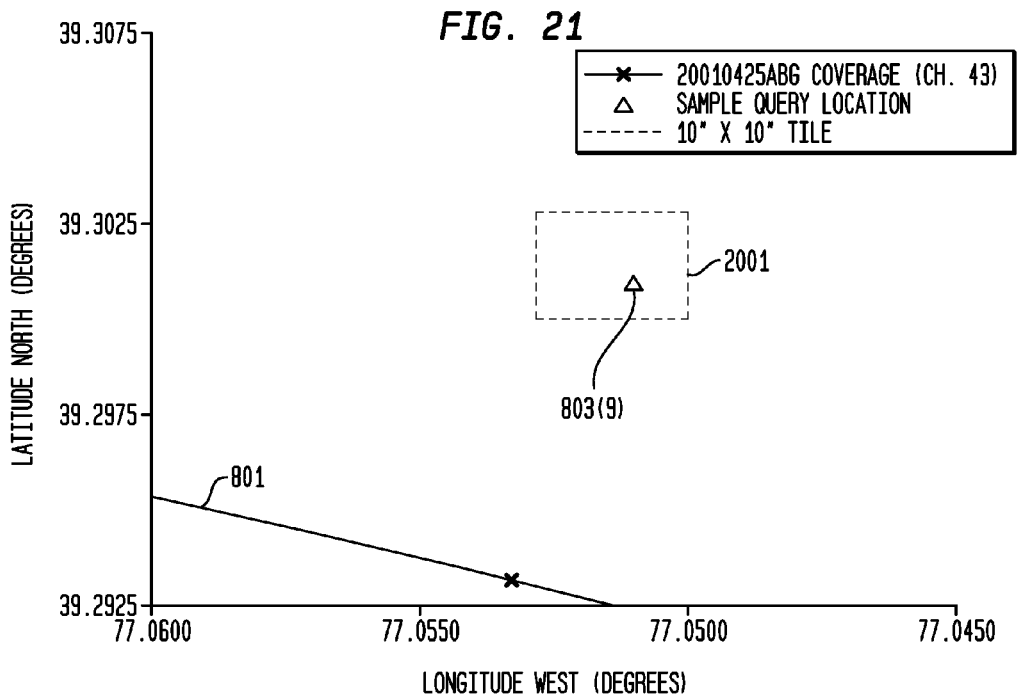
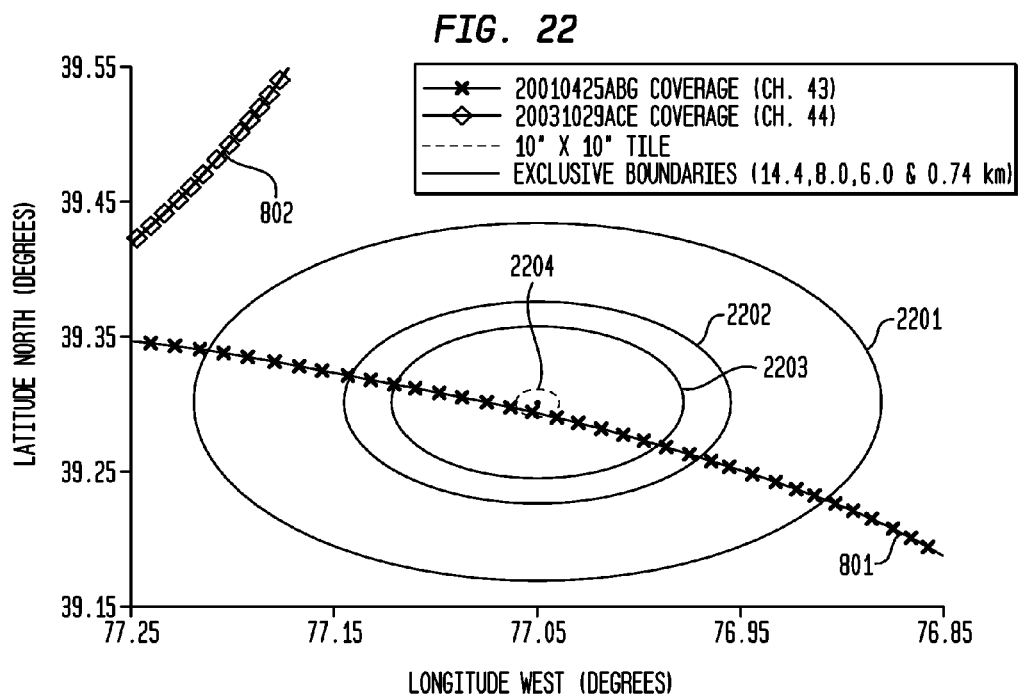

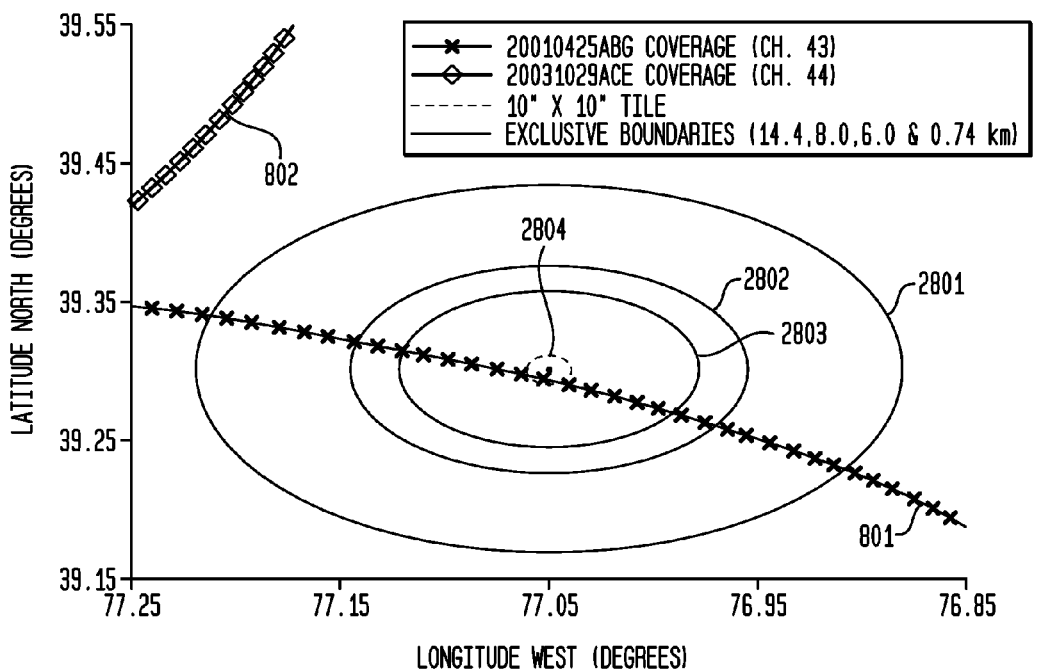
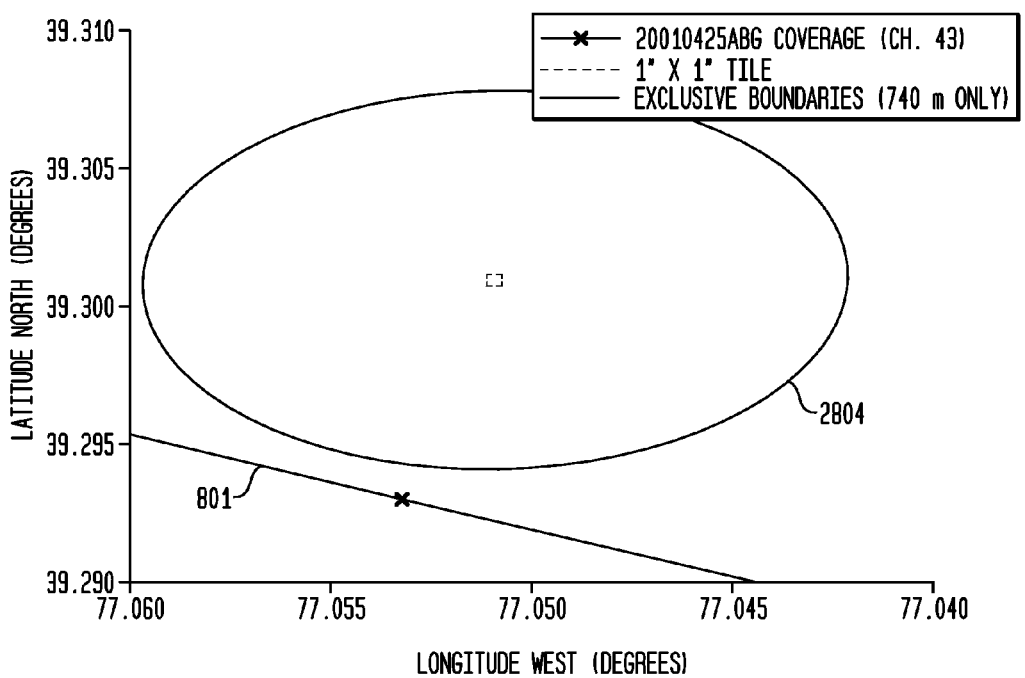

FIG. 31

CHANNEL ALLOCATION IN PROTECTED SERVICE AREAS

CROSS-REFERENCE TO RELATED APPLICATIONS

This application claims the benefit of the filing date of U.S. provisional application No. 61/292,127, filed on Jan. 4, 2010, and U.S. provisional application No. 61/383,099, filed on Sep. 15, 2010, the teachings of which are incorporated herein by reference. This application is related to U.S. non-provisional application Ser. No. 12/966,196, filed concurrently herewith on Dec. 13, 2010, the teachings of which are incorporated herein by reference.

BACKGROUND OF THE INVENTION

1. Field of the Invention

The present invention relates to communications, and, in particular, to allocation of communication channels in the presence of protected communication services in a wireless communication system.

2. Description of the Related Art

TV stations in the United States broadcast over a spectrum of frequencies within the UHF spectrum under licenses granted by the Federal Communications Commission (FCC), with other countries providing TV broadcast services in a similar manner over their own defined sets of government-allocated spectrum. To avoid interference, analog TV stations are spaced apart in frequency, and, since TV signals travel a long way, signals in adjacent areas are separated from each other. Digital TV reduces the bandwidth needs of TV broadcast providers because compression schemes such as MPEG reduce the bandwidth required for a single transmission. Broadcasters can either offer new channels within their spectrum allocations or use their spectrum allocation for high-definition signals, but at the same time, spectrum becomes available for the government to auction to other users. In addition, other types of devices with limited range, such as wireless microphones, are allowed to operate within these bands. However, within the Television (TV) spectrum, unused portions of frequency bands exist due to the spatial variation, frequency fragmentation, and temporal variation required for preventing licensed users (incumbent service providers) from interfering with one another. Recently, the required protection from interference between entities has been reduced using Digital TV as compared to analog TV.

The unused portions of the UHF Television (TV) spectrum, commonly known as "white space" represent frequency bands that might be employed by a growing number of network devices for wireless communication channels. These unlicensed devices, ("TV Band Devices" or "TVBDs") might be allocated frequency bands to operate on these white space channels.

On Nov. 4, 2008 the FCC adopted a set of rules to allow these unlicensed devices to operate in the TV spectrum over a defined set of white spaces including 294 MHz of available bandwidth from channel 2 (512 MHz) to 51 (698 MHz), with the exception of channel 37. Other white spaces exist, and may be the subject of further FCC regulation in the future. The discussion of the FCC's reasoning for the creation of a new class of device, and the new rules allowing such new class of service, are described in a document, "Second Report and Order and Memorandum and Order," released by the FCC on Nov. 14, 2008, and another document, "Second Memorandum Opinion And Order," released by the FCC on Sep. 23, 2010.

As indicated by the FCC, low power devices might be permitted to operate in the TV bands on frequencies that are not being used by authorized services, enabling the development and operation of a wide range of new unlicensed wireless communications devices and systems. These new unlicensed wireless communications devices and systems can operate in white space frequency bands where signals are less subject to propagation losses than bands currently available for such devices. The propagation characteristics of the TV bands also allows devices to provide service at greater distance ranges than existing unlicensed devices.

However, the FCC mandates that new, unlicensed devices not interfere with the incumbent licensed service providers in the TV bands, such as TV broadcast stations, cable head-end services, and devices such as wireless microphones. Since unlicensed broadband devices share spectrum with broadcast TV and other licensed services, unlicensed broadband devices are required to incorporate a capability to avoid causing harmful interference to licensed services in the TV band. Specifically, an unlicensed device must determine whether a TV channel or portion of a TV channel is unused before it transmits. Fixed and personal/portable TVBDs that do not operate in client mode are required to access a central database system as part of such capability to ensure they do not interfere with TV or other licensed entities.

A central database system might be employed, and the process of allocating frequency bands or channels to TVBDs might be accomplished through a service operated by one or more white space allocation service providers. Whether operated by one provider or by multiple providers, a system should allocate substantially the same white space bands when a request from a TVBD device is received. However, given the size of the geographic area such as the United States, the number of incumbent licensed service providers and the number of bands possible, computation of permitted bands to allocate to a TVBD device request is large. A white space channel allocation service provider seeks to provide such channel information to the TVBD device relatively quickly, requiring significantly reduced server computation time when responding to a query by a device, in order to reduce cost and improve efficiency of providing the service.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allocates communication channels for a device to transmit data within a geographic area having protected classes of service. Based on communications characteristics from storage, protected service contours are generated over the geographic area for one or more of the protected classes of service. The region is partitioned over the geographic area into unclassified tiles at a first level of resolution. A processor classifies each unclassified tile, if able, for availability of channels with respect to each protected service contour of the region associated with the tile at the first level of resolution. If the corresponding unclassified tile is not classified, each unclassified tile is divided into nested tiles of one or more subsequent levels of finer resolution, and nested, classified tiles of successive levels of resolution are formed by classifying, if able, each tile at the subsequent level of finer resolution with respect to each protected service contour of the region associated with the corresponding tile at the subsequent level.

In another embodiment, the present invention allocates operating channels by a remote device, the remote device operating within a geographic area having a plurality of protected classes of service. A location of the remote device is determined, and the remote device transmits to a server a query message having a device identification, at least one query location, and one or more desired channels of operation corresponding to each query location based on the location of the remote device. The remote device receives a channel list from the server, wherein the server forms the channel list for each query location by: (i) retrieving pre-computed nested, classified tiles of successive levels of resolution, each tile classified as to channel availability based on verification of protection requirements for protected service contours of the plurality of protected classes of service; (ii) identifying, beginning with a first level and searching successive levels of the nested, classified tiles of successive levels of resolution, a classified tile classified as available with the query location based on the one or more desired channels of operation; and (iii) allocating channels, if available, associated with the identified, classified tile with the query location to the channel list.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 12 shows a magnified view of the 10 arc minute tile having the point of interest shown in FIG. 11 from the original 1 degree tile;

FIG. 13 shows spacing of excluded boundaries in decreasing order around the 10 arc minute tile having the point of interest in FIG. G;

FIG. 16 shows the original 10 arc minute tile of FIG. 14 partitioned into 1 arc minute tiles;

FIG. 17 shows a magnified view of the 1 arc minute tile having the point of interest shown in FIG. 16 from the original 10 arc minute tile;

FIG. 18 shows spacing of excluded boundaries in decreasing order around the 1 arc minute tile having the point of interest in FIG. 17;

FIG. 19 shows a magnified view spacing of 740 m and 100 m excluded boundaries in decreasing order around the 1 arc minute tile having the point of interest in FIG. 17;

FIG. 20 shows the original 1 arc minute tile of FIG. 19 partitioned into 10 arc second tiles;

FIG. 21 shows a magnified view of the tile of interest from among all the 10 arc second tiles nested within the previous 1 arc minute tile of FIG. 16;

FIG. 22 shows spacing of excluded boundaries in decreasing order around the 10 arc second tile having the point of interest in FIG. 21;

FIG. 28 shows spacing of exclusive boundaries around the 1 arc second tile having the point of interest in FIG. 27;

FIG. 29 shows a magnified view of the 1 arc second tile of interest with respect to the 740 m exclusive boundary for a TV channel 43 contour;

FIG. 31 illustrates a mobile device receiving channel allocations for its own tile and surrounding tiles;

DETAILED DESCRIPTION

Figure 1:
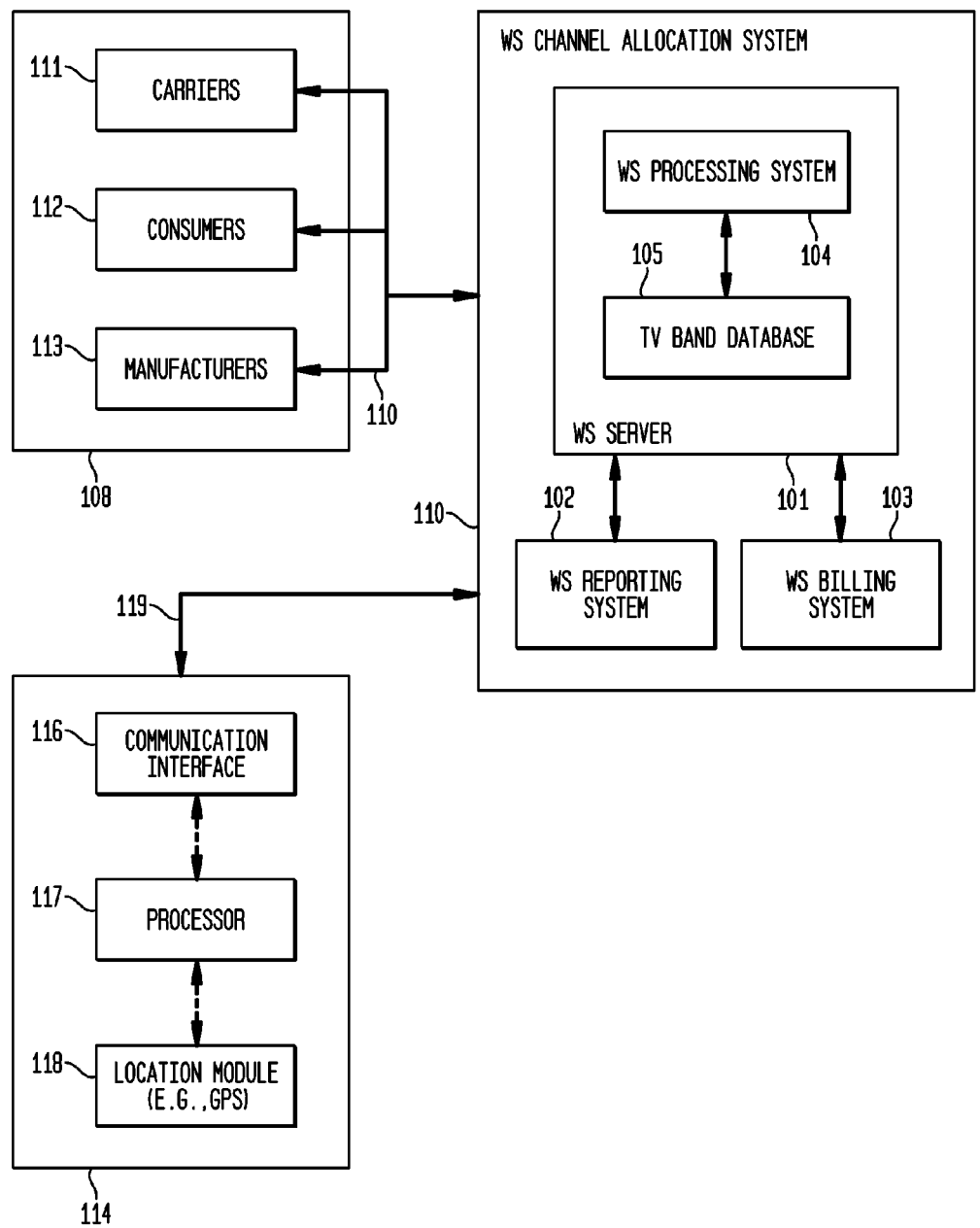
FIG. 1 shows an exemplary WS channel allocation system operating in accordance with an exemplary embodiment of the present invention.

In accordance with embodiments of the present invention, a channel allocation system employs a server to record communication characteristics of incumbent service providers registered or otherwise licensed to operate within certain frequency spectra. The channel allocation system is configured to allow registration of licensed service providers, or access existing licensed service provider databases, to obtain geographic location and channel frequency information. The channel allocation system employs a method of pre-computation of available channel frequency space through classification of areas within a given geographic area that the incumbent service providers operate in. Such classification forms a grid of areas with successive resolution, termed herein as "tiles", over the geographic area and superimposes protected service contours over the geographic area. Protected service contours are formed based on the communication characteristics of incumbent service providers that operate within the tile. The channel allocation system pre-computes channel availability for these tiles, by classifying each tile at levels of successive resolution with respect to the protected service contours within the tile, if present. When a device or user requests a list of channels to operate on at a given location, the channel allocation system determines such list by identifying the tile of highest resolution containing the given location, and from the classification of the determined tile, determining the channel availability from the classification.

For described embodiments herein, the channel allocation system is a white space (WS) channel allocation system populating a WS database (WSdb). Unlicensed users, such as TV band devices (TVBDs), register with the WS channel allocation system and request a channel list of channels to operate on. Based on information in the WSdb, availability of channels at the location of the TVBD requesting the channel list is determined through an iterative search of tiles with successively finer resolution containing the location of the TVBD to identify white space channels that might be included in the channel list.

The present invention, however, is not so limited to allocation of white space channels as specified, for example, by the FCC. Protected services might also be considered for wireless communication systems where unused frequency spectra is available to femtocells within the frequency bands used to provide the network carrier's wireless service. For example, allocation of channels might be employed for a telecommunication femtocell. A femtocell is a small cellular base station, typically designed for use in a home or small business, connecting to a service provider's network via a broadband connection. Current femtocells typically support 2 to 16 active mobile phones depending on type of use, allowing wireless service providers to extend service coverage indoors, especially where access would otherwise be limited or unavailable. Although WCDMA is one application, the might be applied to other wireless communication standards, including GSM, CDMA2000, TD-SCDMA, WiMAX and LTE (3GPP refers to 3G femtocells as Home Node Bs (HNBs)). Femtocells are an alternative way to deliver fixed-mobile convergence (FMC) services. Most FMC architectures require a new (dual-mode) handset which works with existing unlicensed spectrum home/enterprise wireless access points, while femtocell designs work with existing handsets.

Channel allocation techniques currently proposed for allocation of channels in femtocells typically treat an area as a macro cell, and devices monitor at least one broadcast control channel transmitted for the predetermined frequency channels in the macro cell. At least one macro cell frequency channel is identified from that broadcast control channel, and by monitoring broadcast control channels it is possible to identify those frequency channels currently in use within the macro cell. The channels are determined to be those associated with the broadcast control channel received with the strongest signal level by the user equipment (which typically includes measurement circuitry). Alternatively, channel sniffing techniques within the femtocell base station may be utilized. From this information, channels not in use can be determined. Such techniques, however, do not account for other protected services that might exist within the macro cell. Embodiments of the present invention might exploit these existing techniques in addition to the teachings herein to provide for femtocell channel allocations for devices that account for all protected or registered services, as well as provide for better coordination and efficiency of channel use.

FIG. 1 shows an exemplary WS channel allocation system 100 operating in accordance with an exemplary embodiment of the present invention. WS channel allocation system 100 comprises WS server 101 coupled to WS reporting system 102 and WS billing system 103. WS server 101 comprises WS processing system 104 and TV Band Database 105. WS channel allocation system 100, as described in detail subsequently, maintains a database of incumbent or otherwise licensed users of frequencies allocated by, for example, the FCC, as well information and allocated channels to unlicensed TV band Devices (TVBDs). Based on this information, WS channel allocation system 100 might then allocate new channels, through available channel lists, for new TVBDs based on one or more received allocation requests. Such allocation might be in accordance with one or more algorithms, as described below, that provide channel allocation without interference to existing licensed users. In concert with such activities, WS channel allocation system 100 might also provide regular reporting for use by various entities, and might also provide billing and other financial activities related to WS channel allocation services provided by WS channel allocation system 100.

WS channel allocation system 100, through communication link 110, is further coupled to user systems 108 operated by various users requesting white space channel allocation for a TVBD. As shown in FIG. 1, such users include, but are not limited to, communications carriers 111 (e.g., AT&T, Verizon, or other wireless, long distance or local telephony carriers), consumers 112 (e.g., purchasers or users of local or wide area wireless LAN equipment, such as IEEE 802.11 or IEEE 802.16 standard compliant devices and access points, personal digital assistants (PDSs) and the like), and manufacturers 113 (manufacturers of local/wide area wireless LAN equipment or other specialized wireless communications equipment).

Consequently, TVBDs, might directly be in communication with WSdb channel allocation system 100 to request WS channel allocations, but also the users, network operators, and manufacturers of TVBDs might be in communication with WSdb channel allocation system 100 to request WS channel allocations for configuring individual TVBDs, as well as for networks of TVBDs, to provide complete networking or other communication services. For preferred embodiments herein, TVBDs are generally required to not interfere with existing incumbent or other licensed devices operating within the licensed spectra, and are generally required to request channels and receive a permitted channel list, possibly including maximum operating distances, before beginning operation.

Also shown in FIG. 1 is remote device 114, which might be in communication with WS channel allocation system 100, through wireless communication link 119. Although remote device 114 might be a TVBD associated with carriers 111, consumers 112 and manufacturers 113, remote device 114 illustrates that such device might include i) communication interface 116 to enable communications and sense communication link parameters; ii) processor 117 to form messages, enable communications, control channel allocation and otherwise enable functions of remote device 114; and iii) location module 118, such as a global positioning system (GPS) module, to determine a geographic location of remote device 114 about the Earth. Thus, remote device 114 causes communication with, and receives channel allocations from, WS channel allocation system 100.

Although not shown in the FIG. 1, WS channel allocation system 100 includes a security function that monitors various interfaces, such as those coupled to communication link 110, to ensure data integrity and security of information and operation of WS channel allocation system 100 so that only authorized users might access functions within the system. As such, users must register with the system and be verified before actions are taken by WS channel allocation system 100. Security methods might include, but are not limited to, machine-to-machine authentication i) at the time of registration with WS channel allocation system 100 (device authentication) or ii) at the time of initiation of communication by TVBDs previously registered (relationship authentication); and message authentication (through passing evidence to challenges) to verify identity of both parties during real-time message exchanges.

Communication link 110 might be embodied in any of one or more forms of communications media known in the art, such as dedicated data networks, dial up service, cellular/wireless telephony and the like. As shown for the exemplary embodiments described herein, communication link 110 is preferably enabled through the internet, where the protocol might be TCP and UDP. Remote device 114, operating wirelessly in FIG. 1, might also use TCP or UDP through its communication link 119.

For preferred embodiments, to communicate with WS server 101, a TVBD might employ a message including the fields as shown in Table 1, and to process fields from WS server 101, a TVBD might process a message including the fields as shown in Table 2.

TABLE 1

| Field # | Contents of Field |
|---|---|
| 1 | FCC ID Associated with TVBD |
| 2 | Manufacturer Serial No. of TVBD |
| 3 | Message Type (e.g., register, authenticate, channel query, sensing, microphone) |
| 4 | Geographic Location (e.g., location of P/P TVBDs from, e.g., GPS information) |
| 5 | Antenna Characteristics (e.g., height of ground of fixed TVBD) |
| 6 | Authentication (e.g., digital signature or secure hash) |
| 7 | IP address of TVBD |
| 8 | Neighbor TVBD IP address (e.g., TVBD(s) linked to this TVBD) |
| 9 | Source Passcode (for authentication) |
| 10 | Recipient Passcode (for authentication) |

TABLE 2

| Field # | Contents of Field |
|---|---|
| 1 | Message Type (e.g., register, authenticate, channel query, sensing, microphone) |
| 2 | Geographic Location (e.g., location of P/P TVBDs from, e.g., GPS information) |
| 3 | Authentication (e.g., digital signature or secure hash) |
| 4 | Channel List |
| 5 | Source Passcode (for authentication) |
| 6 | Recipient Passcode (for authentication) |

While the exemplary embodiment described herein is with respect to WS channel allocation within the borders of the U.S., with government oversight and regulation provided through the Federal Communications Commission (FCC), the present invention is not so limited. As the practice of licensing communication bands is typically implemented worldwide through government agencies of sovereign governments (e.g., Canada, Mexico, or Australia), the teachings herein might be extended to similar allocation of channels within unused frequency bands where licensed or incumbent users operate. In addition, embodiments of the present invention might be adapted to account for coexistence of WS channel allocation for geographic spaces covering more than one sovereign government's territories. For example, between the U.S. and Canada, there might be provision in WS channel allocation system 100 for registering devices located outside the U.S. that are in Canada operating near the border, as well as recordation of Canadian services licensed within Canada with broadcast area extending within the U.S.

WS server 101 comprises WS processing system 104, having processor and other computational capabilities, that determines WS channel allocations for a TVBD request based on information in TV Band Database 105. WS server 101 also comprises TV Band Database 105 that is employed for storage of information required by WS processing system 104. WS processing system 104 comprises a database interface that coordinates storage and retrieval of information from TV Band Database 105. A database interface allows for timely information flow since TV Band Database 105 potentially represents more than one storage location (e.g., a database locally for storing pre-computed tiles as described subsequently and a remote database of protected service information). WS processing system 104 also comprises an interface for communication with devices of protected and unprotected service classes.

TV Band Database 105 stores WS channel allocation system information related to communication characteristics (such as, but not limited to, geographic location, frequency bands available, geographic coverage, and,) of i) existing licensed users; existing TVBDs; newly registered licensed users; and newly registered TVBDs. TV Band Database 105 further stores pre-computed WS coverage information of classes of protected service users, as described subsequently, employed by one or more algorithms executed by WS processing system 104 to determine the WS channel allocations. WS server 101, being a centralized location of information, also provides a synchronization function for administrators of white space allocation systems, providing registration information of users (described further below), system monitoring information (such as sensing information, described further below), government or other entity required information (such as FCC information required by Section 15.713 of FCC Rules), and protected service contour information (as described further below).

WS server 101 is coupled to WS reporting system 102 and WS billing system 103. WS reporting system 102 provides reports i) for administrators of WS channel allocation system 100, through either paper or electronic means, for record keeping and other system maintenance functions; ii) for entities that enable invoicing, service reports, customer care/service, or other user-specific activities; and for government agencies, such as the FCC, for WS channel allocation performance monitoring and compliance activities by those agencies or representatives.

WS billing system 103 allows for various billing features of WS channel allocation system 100. Once service is established, WS billing system 103 creates a record within its database to track financial tasks. Billing registration of a device or devices for a user record occurs, including tracking of device ownership, along with payment information (e.g., processing of payments, adjustments, payment history, generation of invoice information and summaries, and the like). Such billing might be based on, but not limited to, bandwidth or number of channels allocated, number of requests for WS channel allocation (database "Dips"), reports generated in response to user requests, quality of service, coverage area, and number of TVBDs supported. WS billing system 103 might further interact with corresponding systems of financial institutions (not shown in the FIGs.) to effect payments and credits of users for the services provided by administrators of WS channel allocation system 100.

Operation of WS server 101 including WS processing system 104 and TV Band Database 105 is now described. As recognized by one skilled in the art, storage and processing functions might be implemented with numerous architectures, so, as employed herein, WS processing system 104 represents circuits, structures, and related software/firmware that implements functions employed to process or otherwise implement one or more methods and/or algorithms as described herein, while TV Band Database 105 represents circuits, structures, and related software/firmware employed to store data and other information associated with processing by these one or more methods and/or algorithms.

WS server 101 serves, as described above, incumbent or otherwise licensed users of television spectrum, database administrators (e.g., authorized by FCC), users of TVBDs, and manufacturers of TVBDs. Consequently, a first function of WS server 101 is registration within the system of incumbent or otherwise licensed users (collectively referred to herein as "protected services") of TV spectrum. These users might be classified in two categories: recorded licensed services and unrecorded licensed services. Recorded licensed services comprise, for example, television broadcast or similar stations with information directly recorded through interaction with, for example, FCC or other government agencies. These services generally have well-defined communication characteristics, such as geographic coverage, transmission power, antenna characteristics, primary and adjacent center frequency/channels and channel spacing. Unrecorded licensed services comprise devices permitted by, for example, the FCC to transmit within limited areas within the licensed bands. Unrecorded licensed services comprise, for example, wireless microphones. These services generally define and provide to WS server 101 their communication characteristics through registration via communication link 110 (or through provision by another party, such as the FCC). For example, tunable wireless microphones might register their location (e.g., coordinates through, for example, GPS) and center frequency; operators of relatively-fixed wireless microphones might register their location and one or more polygons around points of likely use; and operators of relatively-dynamic wireless microphones might register their current location and provide continued, relatively real-time update of coordinates.

A second function of WS server 101 is registration of TVBDs and other classes of unlicensed users of TV spectrum (collectively referred to herein as TVBDs) within WS channel allocation system 100 so that WS server 101 might assign and provide channels within a portion of the TV spectrum communications medium. Such registration is initiated by a request submitted either directly from the device as a registration and/or channel list request, or by users of one or more devices enabling a network of TVBDs. Upon successful registration, a TVBD might be allocated one or more channels from the channel list either directly or as negotiated for the device (if negotiation is allowed) with WS server 101. As part of such function, WS server 101 calculates channel availability for the request so as not to cause harmful interference to protected services. Registration might occur for fixed TVBDs and P/P (peer-to-peer or otherwise mobile) TVBDs. Channel lists, in addition to identifying available operating channels by frequency and bandwidth, might also provide maximum operating power levels for the particular TVBD device type.

Calculation of channel lists occurs through an Asynchronous Calculation Mode (AC) Mode and Real-Time Calculation (RTC) Mode. Preferred embodiments of the present invention employ one or more algorithms that perform these calculations with successive degrees of resolution, with coarser levels employed to allow pre-calculation of areas of points unavailable to WS channel allocation, and finer levels employed to identify specific areas of points available for channel lists. Preferred embodiments might define the finest degree of resolution as a 1 arc second by 1 arc second area, referred to herein as a "1 Arc Second Tile". For a 1 Arc Second Tile, all points within the tile are sufficiently spaced from geographic locations for protected services to meet interference protection requirements, with each 1 Arc Second Tile classified as "available" or "unavailable" for channel allocation (inclusion or exclusion, respectively, within a channel list). A channel is identified as "available" if its use would not produce interference to protected services and their location reaches a threshold distance (e.g., 1 k) from protected service coverage areas.

During AC Mode, WS server 101 generally searches for white space channel availability in vicinity of protected services, and might perform a portion of such searches in the absence of a request or in response to an update within WS server 101 for new registration or change in registration of FCC licensed user, such as, but not limited to, changes in geographic coordinates, transmit power or channels of a TV broadcast system, or new registration of a wireless (polygon-type) microphone. During RTC Mode, WS server 101 generally searches for white space channel availability in vicinity of protected services in direct response to a request from a TVBD or a licensed service wireless (dynamic-type) microphone to WS server 101. Such RTC Mode search generally occurs in real time to provide a channel list to the source of the request in a relatively short period of time. Calculation of channel lists by WS server 101 is now described.

Figure 2:
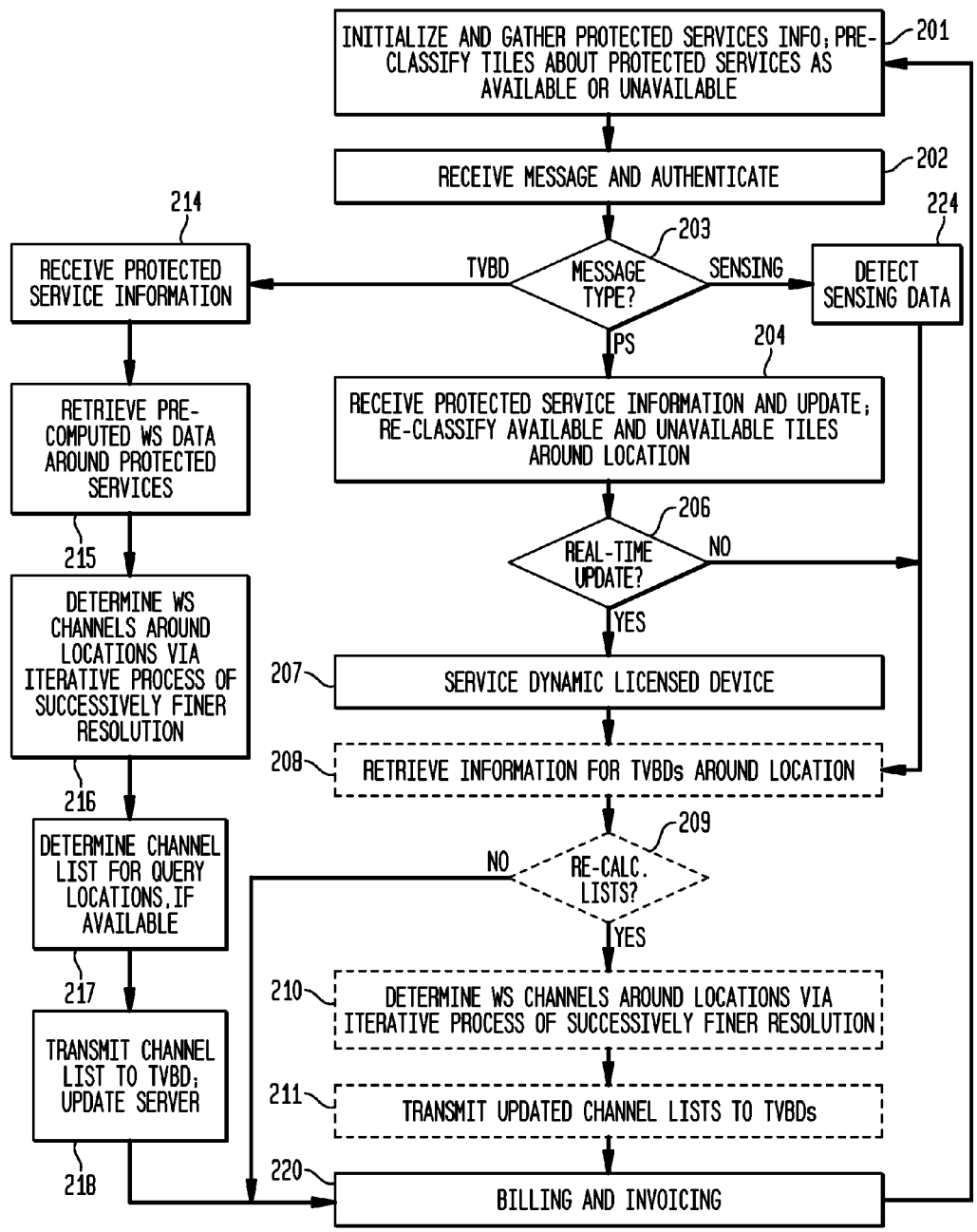
FIG. 2 shows an exemplary method of operation by the WS server of FIG. 1.

FIG. 2 shows an exemplary method of operation by WS server 101. At step 201, the method initializes itself and gathers information of communications characteristics for protected services existing within its (and possibly external) database(s). During an initialization phase, the method might Pre-classify, through pre-computation, areas in which no points can satisfy sufficient spacing from geographic locations for protected services to meet interference protection requirements, and so these tiles might be initialized to "unavailable" (points have no available channels), as well as classify tiles that are available. At step 202, the method receives a message, and performs identification, authentication and security processing. If the message satisfies these processing tasks, at step 203, a test determines whether the message type i) relates to a protected service (either, e.g., through a new license grant, an updated licensed service, a cable head-end service, or a tunable/relatively-fixed wireless microphone); ii) is from a TVBD; or iii) is a sensing message.

Typically, for protected services enabled through, for example, a license from the FCC, a grace period (e.g., 24 hours) might be available after the message is received to perform necessary processing of new channel lists for existing TVBD devices in an area around the new or updated protected service. However, for dynamic-type wireless microphones, for example, such grace period is negligible, though affected coverage area is minimal in such case, allowing for some interference to TVBDs. Although existing TVBDs in the area may experience some interference, the TVBDs typically operate over primary and secondary channels and can switch to better available channel based on a BER (bit error rate) or a RSSI (received signal strength indicator) threshold test until a new channel list is allocated or otherwise assigned to the TVBD. Note that support of dynamic registration (such as for microphones) might be optional, for example, since current systems such as proposed in the "Second Memorandum Opinion And Order," of Sep. 23, 2010, of the FCC do not specify dynamic microphone registration.

Returning to FIG. 2, if the test of step 203 determines that the message relates to a protected service (PS), then, at step 204, the method receives and updates the server database with communications characteristics for the protected service device(s) (either directly from the device, such as a wireless microphone, or indirectly through a user database, such as that maintained for FCC TV broadcasters). The method might update the server database with ("contours" or "contour space") of the protected service(s) associated with the message. The method then re-classifies tiles around the newly updated protected service area as unavailable (points have no available channels), as well as classify tiles that are available. At step 204, the method might also perform further security and other authentication steps. At step 206, at test determines if the protected service device(s) is a dynamic device that requires real-time update and use, such as dynamic microphones, and, if so, at step 207, the method services the dynamic licensed device.

From step 207, the method optionally advances to step 208. Steps 208 through 211 are employed to affirmatively update TVBDs with new channel lists if the re-classification of step 204 would impact channels that the TVBDs operate with. Steps 208 through 211 are optional and not, for example, required for FCC operation.

If the test at step 206 determines that the protected service device(s) does not require real-time update and use, at step 208, the method retrieves information for TVBDs having allocated channels around the location(s) (or "contour space") of the protected service device(s) associated with the message. At step 209, a test determines if the retrieved information for TVBDs around the protected service device(s) requires re-calculation of channel lists. If the test at step 209, determines that updated channel lists are required for one or more of the TVBDs, the method proceeds to step 210 to determine available channels for points in the area through an iterative process of searching tile classifications about the location of interest to the smallest resolution. At step 211, the method determines and transmits updated channel lists those TVBDs requiring new channel lists based on the test at step 209. From step 211, the method optionally advances to step 220, described below, and then returns to step 201 to await the next message. If the test at step 209, determines that updated channel lists are not required for one or more of the TVBDs, the method optionally advances to step 220, described below, and then returns to step 201 to await the next message.

If the test of step 203 determines that the message relates to a TVBD, then, at step 214 the method retrieves from the server database communications characteristics for protected services device(s) in the vicinity of the TVBD associated with the message. At step 214, the method might also perform further security and other authentication steps. At step 215, the method retrieves pre-computed data corresponding to available and unavailable white space channels around the location(s) ("contours" or "contour space") of the protected service device(s) associated with the message. At step 215, the method might also retrieve information (as part of pre-computed data) for allocated channels to other TVDBs in the vicinity to eliminate used, allocated, or otherwise assigned channels from the computations. At step 216, the method continues to determine available channels for points in the area through an iterative process searching tile classifications about the location of interest through successive levels of finer resolution from the pre-computed data beginning at the highest level (i.e., the lowest resolution). At step 217, the method determines a channel list for the TVBD associated with the message. At step 218, the method transmits the channel list to the TVBD, updating its server database accordingly. From step 218, the method optionally advances to step 220, described below, and then returns to step 201 to await the next message.

If the test of step 203 determines that the message sensing message, then, at step 224, the method detects the sensing data. Typically, sensing data is generated by TVBDs measuring signal noise or interference power near to the sensing TVBD. The TVBD might indicate that the sensed signal is above, for example, an FCC-defined detection threshold and IP address(es) of neighboring TVBDs. Sensing data might be relayed to one or more neighboring TVBDs through, for example, the Internet. The method might use such sensing data to track transmission and/or present (e.g., instantaneous) location of protected service devices, such as wireless microphones, for use by the system. From step 224, the method advances to step 208 to determine whether the sensing data should initiate an update of channel lists for TVBDs in the vicinity. Note that the capability for sensing requirements for database enabled TVBDs might be optional since some systems, such specified by the "Second Memorandum Opinion And Order," of Sep. 23, 2010, of the FCC do not specify such requirement.

Optional step 220 of the method of FIG. 2 represents steps associated with billing and invoicing for providing registration and channel list allocation for TVBDs accessing WS channel allocation system 100. Each message received from a TVBD is recorded, along with each action taken by the system, and associated with the corresponding registered user or otherwise responsible party. Consequently, step 220 tracks actions and incurred charges (or credits, if, for example, white space channels are de-allocated from a TVBD upon entry of a protected service) for each registered user.

Figure 3:
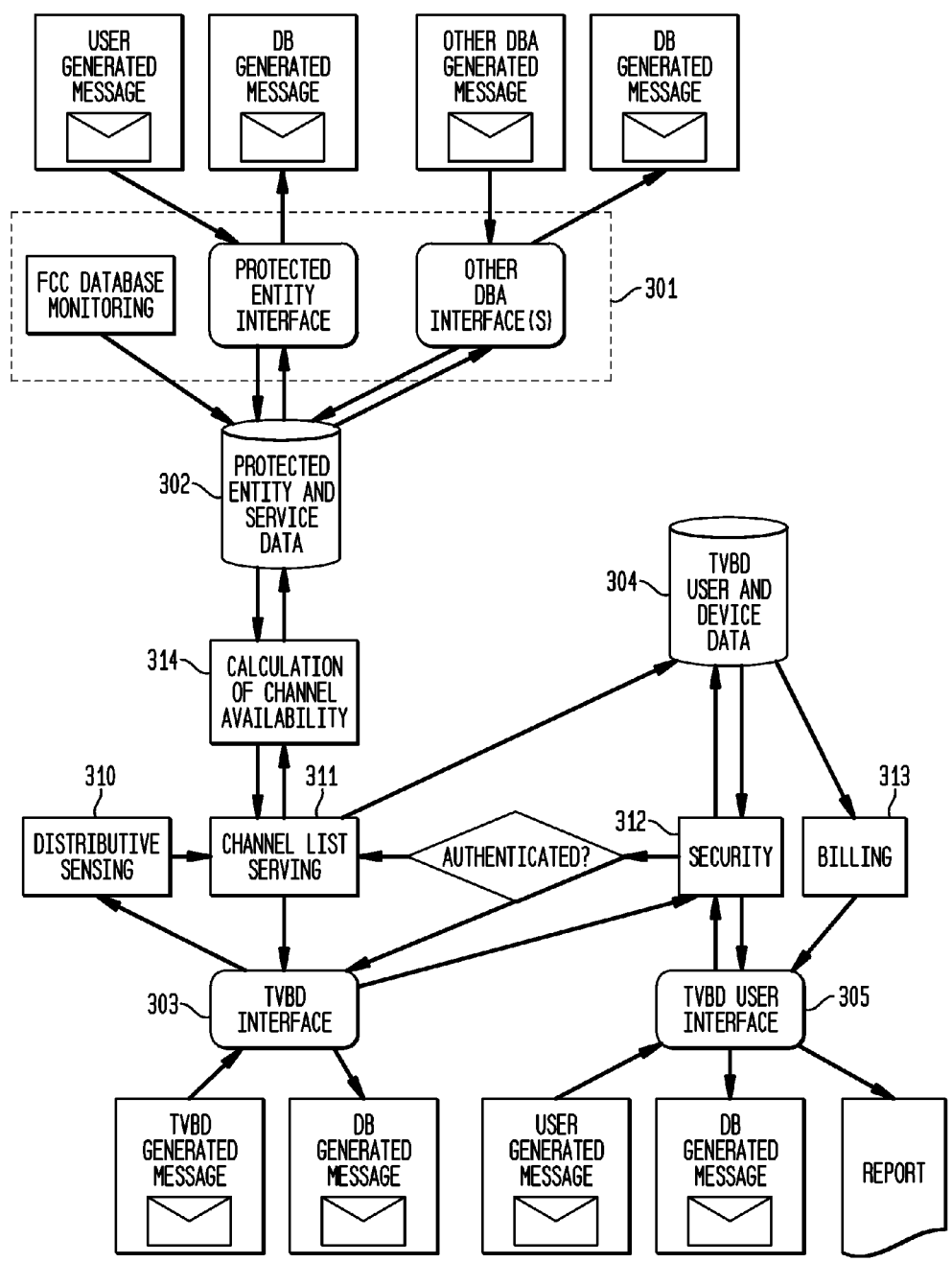
FIG. 3 shows an exemplary architecture for the WS server of FIG. 1 as might be employed to implement the exemplary method shown in FIG. 2.

FIG. 3 shows an exemplary architecture for WS server 101, showing information flow and processing, as might be employed to implement the method shown in FIG. 2. Through interface 301, server access is controlled for FCC monitoring, protected service monitoring, and other entities contracting for access to WS server 101. Through interface 301, protected service data (e.g., entity, service information and other registration information) is populated and maintained in protected entity and service database 302, and various reports required by protected services or server administrators generated. Similarly, through interface 303, server access by TVBD devices is controlled for receipt of TVBD messages, including sensing information and channel list requests and allocation. Through interface 303, TVBD data from a device (e.g., user, device, channel list information, and other registration information) is populated and maintained in TVBD user and device data database 304. Through interface 305, server access by TVBD users is controlled for receipt of TVBD registration and user-generated information, and generation of user defined report and billing information. Through interface 305, TVBD data from a user (e.g., user, device, channel list information, and other registration information) is populated and maintained in TVBD user and device data database 304.

Between TVBD device and user interfaces 303 and 305, various functional modules may be maintained: distributive sensing module 310, for interpreting distributive sensing data; channel list serving module 311, for coordinating production/update of channel lists in response to TVBD requests and populating the corresponding data in TVBD user and device data database 304; security module 312, for ensuring authentication of TVBD device/user and other server administrator access, as well as provide various defenses for the server against malicious external access, and billing module 313, for performing various billing and financial record tracking. Channel availability calculation module 314 is employed to generate the available white space channels for inclusion in lists, as queried by channel list serving module 311, through access of data in protected entity and service database 302. An exemplary method employed by channel availability calculation module 314 is now described.

Operation of WS Server and Pre-Classification of Tiles

An individual "protected service" or "protected entity" is determined from a license or regulation of, for example, the FCC. "Protection requirements" for any individual protected service can be described using three types of information: (i) a range of spectrum (whether specified in MHz, e.g. 512-518 MHz or TV channel 21), (ii) a "service area" or "protected area", i.e. a geographic area defined by a polygon of points, and (iii) a required separation distance ("spacing") between such a protected area and a TVBD. An individual service may have multiple protection requirements. For example television services are protected on three channels (the operating channel ("co-channel") as well as any channels on either side of the "co-channel" within television spectrum allocation tables available through the FCC (the "adjacent" channels, and most, but not all, television stations have two adjacent channels as the television spectrum allocations are not contiguous). The FCC's $2^{nd}$ Report and Order on TV Band Devices requires certain such devices to transmit to a database its geographic location and receive a list of available channels before beginning to transmit.

Given protection requirements, a contour might be generated defining an area within which the protection requirements must be met. The protected area for the exemplary embodiments herein is defined by a "polygon". A protected area might be defined by N geographic points from 0 to 359 degrees at M azimuths from 0 to 359 degrees from the center emitter (e.g., the transmitter antenna), where N and M are positive integers. "Lines" are drawn in the Cartesian plane of latitudes and longitudes between the adjacent points. Combining sample points with linear interpolation is a typical method for describing a contour about the protected area over a surface area on an ellipsoidal (geodetic) model of the Earth's surface. For example, as is known in the field of TV broadcast engineering and as used by the FCC, a protected area for a television license is defined by 360 geographic points at azimuths from 0 to 359 degrees from the transmitter.

Figure 4:
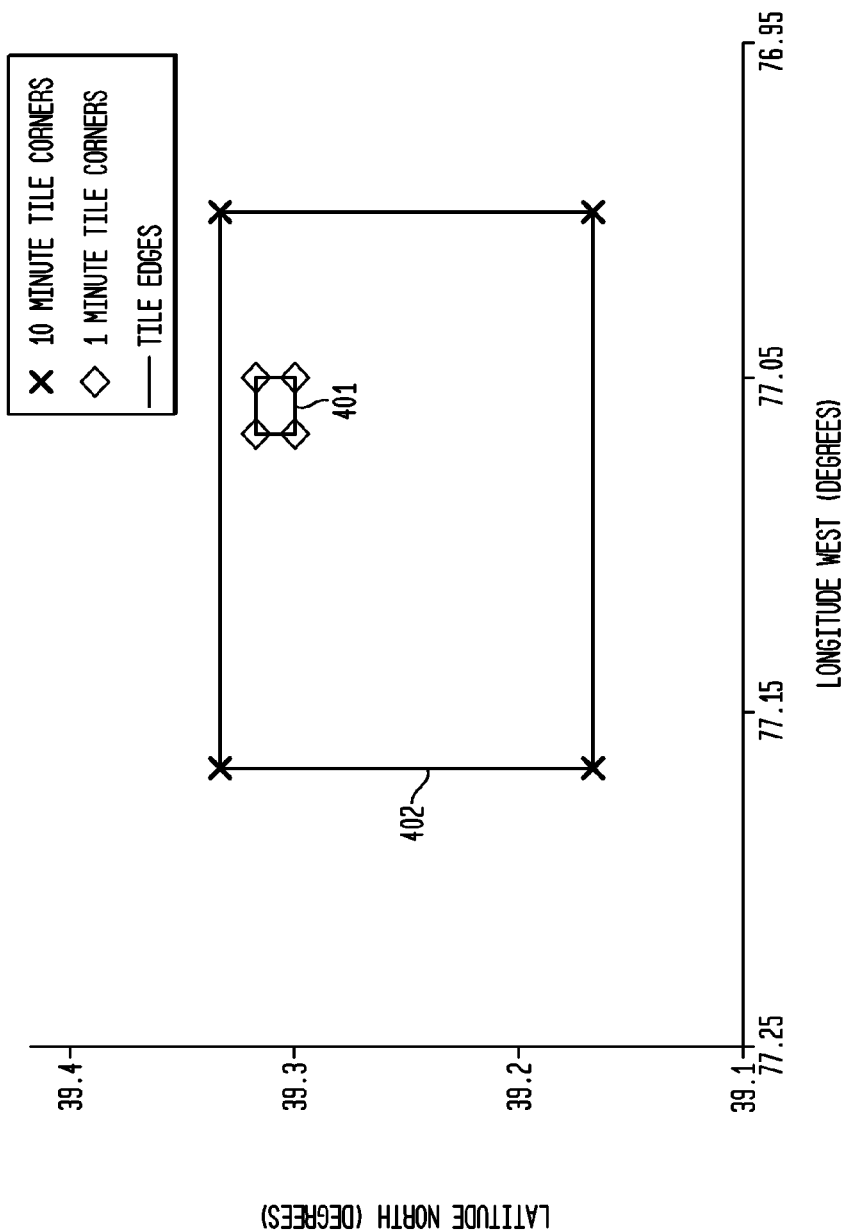
FIG. 4 shows a 1 minute tile inside a 10 minute tile.

A mathematical definition of a polygon surrounding a protected area is formed. A protected area P is a set $V_P$ of n ordered points $(x_i, y_i)$ with i=1, 2, . . . , n. Each point is determined by a regulatory quantity $q_{reg}$ evaluated using some regulated methodology (represented as a mathematical function $f_{reg}$). The points are ordered with increasing azimuths θ from the nominal center of the protected area $(x_c, y_c)$. The polygon is completed using linear interpolation between the corners (or vertices) $V_P$ as stated in the set $E_P$ that defines the polygon edges. FIG. 4 shows 1 minute tile 401 inside 10 minute tile 402. In each case, the corners of the enclosed areas are individual points (i.e. $(x_i, y_i)$), and the edges of such areas are linear interpolations between given pairs of points, i.e. $\alpha(x_i, y_i) + (1-\alpha)(x_{i+1}, y_{i+1})$, $0 \leq \alpha \leq 1$. The areas referred to herein are in terms of interior of a polygon. The shape of the polygon depends on the order of the points $(x_i, y_i)$, so $(x_1, y_1)$ and $(x_2, y_2)$, for example, cannot be substituted for one another without changing the shape of the polygon. Any particular polygon encloses a particular area, and an area that includes the edges of the polygon and the area within the polygon as an area defined as a function of a polygon, i.e. A(P).

Generally, protected service areas, and television coverage areas in particular, need not be convex areas. Potentially non-convex polygons might be replaced with sets of convex sets. A non-convex area might be defined using sets of triangles, each created by three points: an adjacent pair of points that form the polygon and the "nominal center" of the protected area described by the polygon. The transmitter or receiver for the service of interest is employed as the nominal center of the protected area, if such transmitter's or receiver's location is available, otherwise a point is arbitrarily chosen such that triangles may be constructed within the interior of the area in question. For example, an actual Cartesian center of a tile or any point within such a rectangle might be used as a nominal center for a tile area.

Figure 5:
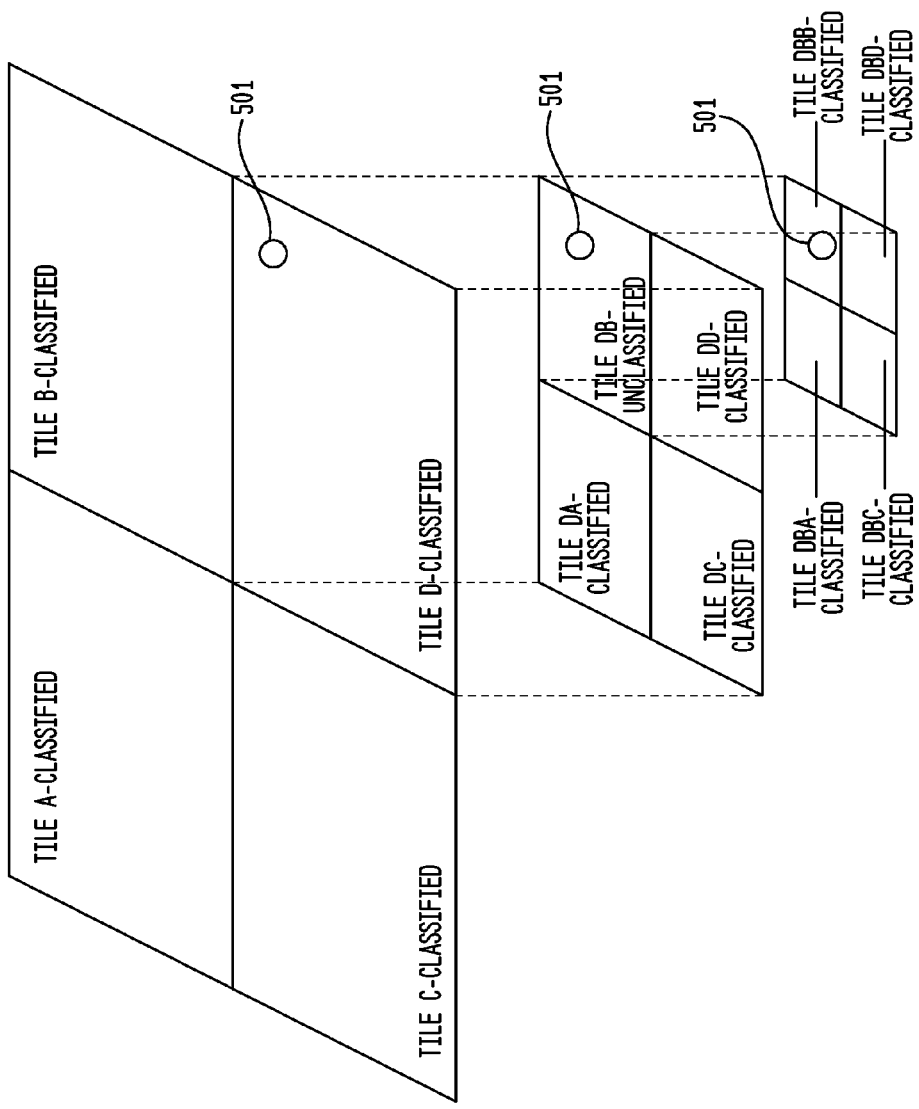
FIG. 5 illustrates a classification of channel availability within tiles of successive resolution within a grid over a geographic area containing a device at a given location.

FIG. 5 illustrates a classification of channel availability within tiles of successive resolution within a grid over a geographic area containing a device at a given location. In FIG. 5, four tiles at the highest level of resolution, Tiles A, B, C and D, are shown. Through a process of classification, frequencies within Tile A are classified as, for example, available or unavailable. Similarly, Tiles B and C are classified. However, at the highest resolution, frequencies within Tile D are undetermined (some might be available, some unavailable), so Tile D is further divided into Tiles DA, DB, DC, and DD at a second, finer level of resolution. At this second, finer level of resolution, Tiles DA, DC, and DD can be classified, but Tile DB is remains unclassified. Tile DB is further divided into Tiles DBA, DBB, DBC, and DBD at a third, finer level of resolution. At this third, finer level of resolution, Tiles DBA, DBB, DBC, and DBD are all classified. Subsequently, a request is received for channel allocation by a device at location 501. A search of tiles of successive finer resolution indexed by the location coordinates of 501 yields a search sequence: first level Tile D—no determination; second level Tile DB—no determination; third level Tile DBB—determined by classification. Therefore, device at location Z01 receives channel allocations in accordance with the classification of Tile DBB. If classification of Tile DBB yields no channels available, no channel is allocated to the device, but if classification of Tile DBB yields a set of channels available, the device at location 501 is allocated some set of these channels.

Figure 6:
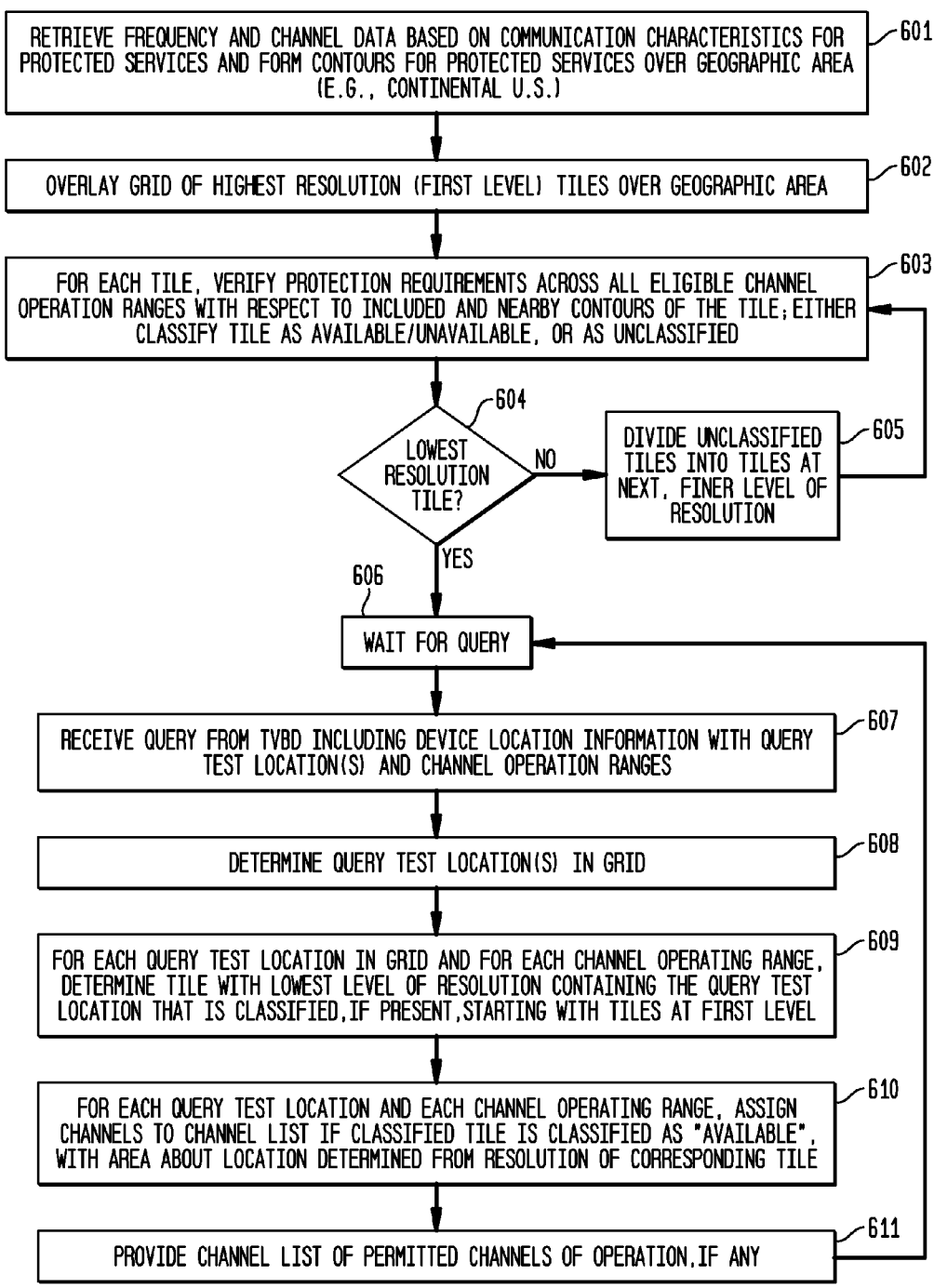
FIG. 6 shows an exemplary method of channel allocation through tile classification.

FIG. 6 shows an exemplary method of channel allocation through tile classification, such as might be employed by embodiments of the present invention. At step 601, protected service frequency/channel data are retrieved from a database. Based on these communication characteristics for the protected services, and contours are formed for each of the protected services over a given geographic area (e.g., continental U.S.). The method retrieves frequency/channel data for each of the protected services "within range" of the querying TVBD. For example, for a TV protected service, "within range" might be defined as a TV transmitter within 314.4 km of the TVBD since (i) 14.4 km is the maximum spacing requirement and (ii) 300 km is the regulatory limit for protection of TV in this context. Similarly 80 km between a cable headend and a TVBD is "within range" since 80 km is the maximum protected distance for such entities; and 400 m is "within range" for a registered wireless microphone. From retrieved data, geographic coordinates are defined to form contours for protected service about a closed area. In common practice, simple linear interpolation of geographic coordinates might be employed between the given number of points on the contour to define a continuous mathematical function encompassing the closed area.

At step 602, a grid of highest resolution tiles (a "first level of resolution") is overlaid on the Geographic area. Definition of an exemplary grid and the grid's formation with respect to preferred embodiments is described in greater detail subsequently.

At step 603, for each tile at the given level of resolution, verification of protection requirements is repeated across all eligible channels of operation based on the contours of step 601. For example, the verification is subject to protection requirements verified based on location, with personal/portable TVBDs ("P/P TVBDs") permitted to operate on 30 TV channels, (channels 21-51, excluding channel 37), and fixed TVBDs permitted to operate on 50 TV channels, (channels 2-51) and for all protected services or entities determined for a given channel of operation. Verification of protection requirements for any individual protected service or entity is met by computing distances between the protected area(s) for the protected entities or services and the TVBD itself.

Verification for step 603 may be expressed mathematically as, for a given query test location $(\hat{x},\hat{y})$ all points (x,y) that are on or inside the contour of a protected area A, satisfy the relation (1):

$$d(\hat{x}, \hat{y}) = \min_{x,y}\{f(\hat{x}, \hat{y}, x, y) : (x, y) \in A\} \quad (1)$$

where, $f(x_1,y_1,x_2,y_2)$ is the distance between two geographic points $(x_1,y_1)$ and $(x_2,y_2)$; "x" and "y" are longitude and latitude points evaluated, respectively; and "x" and "y" are longitude and latitude points, respectively, of the query test location. Thus, the protected area A is defined by a polygon as described previously, and protected area A for a television license is defined by 360 geographic points at azimuths from 0 to 359 degrees from the transmitter with lines drawn in the Cartesian plane of latitudes or longitudes between the adjacent points.

This might be considered a "brute force" method of calculation (of verification) for individual points, but for real-time allocation of channels, as mentioned above with respect to FIG. 4, embodiments of the present invention employ the method of FIG. 6 of dividing the calculations into pre-calculated results for defined areas, or tiles, with such division based upon a structure of tiles having successively higher/finer resolution. Lower resolution tiles might be pre-calculated to eliminate large numbers of points as being unavailable, while pre-calculation of tiles at higher resolution might be employed to identify small groups of points in particular areas that are available. Based on the verification process, each tile of a level is determined to be either classified (a decision made as to whether channels are available or unavailable for all locations within the area of the tile) or unclassified (cannot determine if channels are available or unavailable for all locations within the area of the tile).

After step 603, a test at step 604 determines if the lowest resolution tiles have been analyzed. If the test of step 603 determines that the lowest resolution tiles have not been analyzed, at step 605, the unclassified tiles are further divided into tiles at a next, finer level of resolution, and the method returns to step 603. If the test of step 603 determines that the lowest resolution tiles have not been analyzed, pre-computation and classification for all tiles has finished, and the method advances to to step 606 to wait for a query message.

At step 607, the method receives a query from a TVBD, including device location information having i) a set of test query locations and ii) eligible channels of operation per location. For example, a query to the WS channel allocation system by a TVBD at particular geographic location yields only two television licenses for all protected services "within range" for step 601 described with respect to FIG. 6.

At step 608, each test location of a TVBD query is located within the grid. At step 609, for each query test location in the grid and for each channel operating range associated with the location, the tile with lowest level of resolution that is classified containing the query test location, if present, starting with tiles at the first, lowest level of resolution.

At step 610, for each query test location and each channel operating range, channels are assigned to channel list if classified tile is classified as "Available", with area about the location determined from the resolution of the corresponding tile. Therefore, if verification of protection requirements for an eligible channel of operation for the querying TVBD is positive for a tile at the first classified level, the eligible channel is available and added to a potential list of white space channels to allocate to the TVBD; otherwise, if verification is negative for the tile, the eligible channel is determined to be "unavailable" for the requested operating range of the query. The potential list of white space channels to allocate might not, in practice, be a final channel list since other requirements might be imposed by operators (e.g., certain frequency bands are reserved for premium service, or some channels are noted for problems). At step 611, the channel list is provided to the TVBD, and then advances to step B06 to wait for the next query message.

Figure 7:
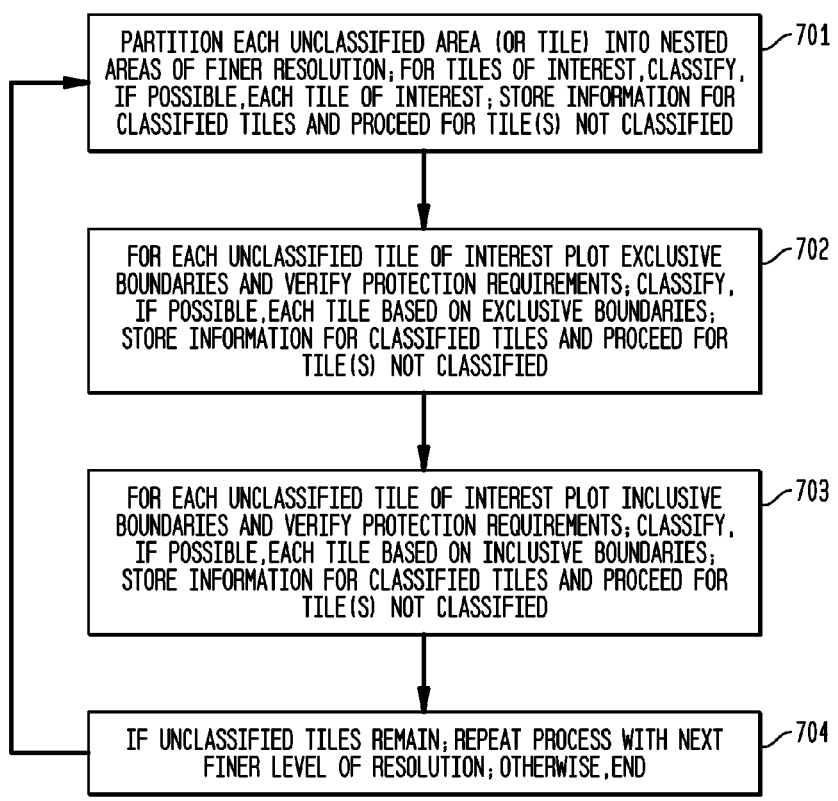
FIG. 7 shows an exemplary method of calculations for storage and retrieval of available spectrum for channel lists for use with the exemplary method of FIG. B in accordance with an exemplary embodiment of the present invention.

FIG. 7 shows an exemplary method of calculations for storage and retrieval of available spectrum for channel lists for use with step 603 of FIG. B in accordance with exemplary embodiments of the present invention. At step 701, each unclassified area (or tile) is partitioned into a nested set of tiles of finer resolution; and for each tile of interest, classify, if possible, the tile of interest. Such classification simply tests the tile to verify the protection requirements based on the border of the tile. Once tested, the result for the tile is tracked as available, unavailable, or unclassified. Information for each classified tile is stored, and the method proceeds to step 702 for the unclassified tile(s).

Spacing around a protected service areas and/or entities might be specified by entities defining those protected service areas (e.g., the FCC specifies 14.4 km, 8.0 km, 6.0 km, 740 m, and 100 m and 0 m). Such spacing defines one or more distances from an emitter of energy, and might be determined based on the type of interference, antenna power, antenna height, geographic location, and the like. Thus, regulations or engineering practice sets protected distances around such entities in all or various directions around each protected service area. In accordance some embodiments of the present invention, such spacing distances are employed as exclusive boundaries for a tile, without other, or additional, spacing requirements.

At step 702, for each unclassified tile of interest, one or more exclusive boundaries are plotted about the tile. Such plot of an exclusive boundary, for example, receives a distance which is then plotted around the tile's perimeter in the direction away from the center of the tile. An exclusive boundary might also be approximated with a polygon, or, more conservatively, with a geographic circle. The term geographic circle indicates the circle considered is a circle with all points equidistant from the center with distance (r) given by a measurement or model of the surface of the Earth (e.g., distance might be given by methods including, but not limited to GPS measurements of distance, Vincenty's Method for calculating distance using an ellipsoid model, or a regulatory distance calculation such as specified by the FCC in the United States).

Again, an attempt to classify the tile tests the tile to verify protection requirements using this exclusive boundary as an outer bound. Once tested, the result for the tile having exclusive boundaries is tracked as available, or unclassified. Information for each classified tile is stored, and the method proceeds to step 703 for the unclassified tile(s). At step 702, for some embodiments, tiles might be classified as available with respect to permitted exclusive boundaries for which protection requirements are verified. (i.e., classified as available for one exclusive bound distance, but unclassified for a different bound distance).

At step 703, for each unclassified tile of interest with respect to exclusive boundaries, inclusive boundaries are plotted and protection requirements verified for these inclusive boundary areas. An inclusive boundary might be employed to define a bounded area within a tile of interest. By defining an interior area of the tile, the method might determine some protection requirements are met by the tile given certain bounded distances of operation for a emitting device (e.g., TVBD) within the tile. For example, one or more bounded distances might be employed and plotted about the tile's perimeter in the direction toward the center of the tile. Instead of such plotting about the tile's perimeter, an inclusive boundary might also be approximated (e.g., a predefined shape or area defined with a polygon, or, more conservatively, with a geographic circle within the tile.

At step 703, again, an attempt to classify the tile of interest tests the tile to verify protection requirements using this inclusive boundary as an outer bound for the area of the test. Once tested, the result for the tile of interest having inclusive boundaries is tracked as available, unavailable, or unclassified. Information for each classified tile is stored, and the method proceeds to step 704.

At step 704, if unclassified tiles remain, the method returns to step 701 to repeat steps 701, 702, and 703, with a next, finer level of resolution. If all tiles at all levels of resolution have been classified, then the method ends. At this end point, the channel allocation system has pre-computed and classified tiles over each frequency band, or channel, covering the geographic area. These tiles can be organized and addressed in storage memory based on the levels of successively finer resolution tiles.

If a query from, for example, a TVBD is received by the channel allocation system, each location of the test query might be associated with a series of tiles of successively finer resolution containing the location. Starting at the highest level/coarsest resolution, a simple address search of the sequence of successively finer resolution tiles containing the location tests whether each tile of the sequence is classified. Once the first classified tile is found, a determination of frequency band, or channel, availability for the location is made based on the classification (e.g., if "available" add tile's frequency band or channel to a channel list, but deny use of the frequency band or channel if "unavailable").

Description of a Working Example of WS Channel Allocation System

The following describes an example for the method of FIGS. 5, 6, and 7 involving two protected services: TV licensees operating on channels 43 and 44. Further, for the working example at step 607 of FIG. B, the WS channel allocation system receives a query from a TVBD, including device location information having i) a set of test query locations and ii) eligible channels of operation per location. The query to the WS channel allocation system by a TVBD at particular geographic location yields only two television licenses for all protected services "within range".

Figure 8:
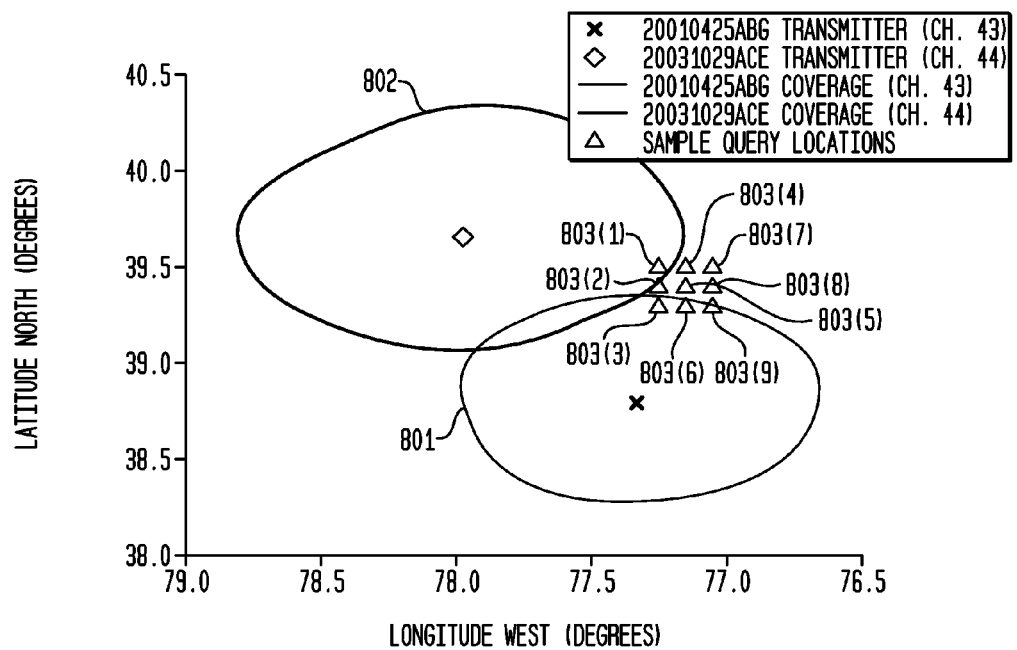
FIG. 8 shows two protected areas for an exemplary set of nine queries by TVBDs.
Figure 9:
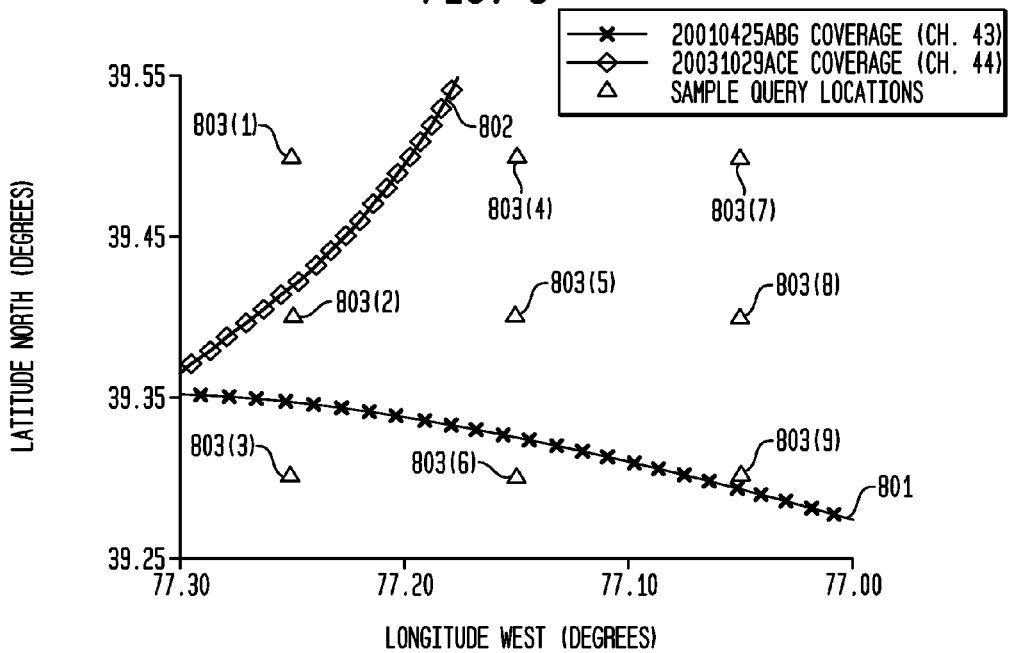
FIG. 9 shows a magnified view of the two protected areas for the exemplary queries by TVBDs shown in FIG. 8.

The two such protected areas of the exemplary query of a TVBD are shown in FIG. 8. FIG. 8 shows contours 801 and 802 for two protected services: TV licensees operating on channels 43 (contour 801) and 44 (contour 802). Also shown in FIG. C are nine query test locations 803(1) through 803(9). As shown, query test location 803(1) is within protected service contour 802, query test locations 803(3) and C03(6) are each within protected service contour 801, query test location 803(2) is near both contours 801 and 802, and 803(9) is on a border of protected service 801. Query test locations 803(4), 803(5), 803(7), and 803(8), are shown outside of the protected service contours 801 and 802. FIG. 9 shows nine query test locations 803(1) through 803(9) of FIG. 8 with greater resolution.

For the example of FIG. 8, the spacing from the two protected areas to nine test query locations are as given in Table 3:

TABLE 3

| Sample Query Locations (each location Δ) | | Spacing to Contours (meters) | |
|---|---|---|---|
| Latitude (degrees N) | Longitude (degrees W) | Channel 43 (symbol x) | Channel 44 (symbol o) |
| 39.301 | 77.051 | 880 | 21572 |
| 39.301 | 77.151 | Interior | 14605 |
| 39.301 | 77.251 | Interior | 8028 |
| 39.401 | 77.051 | 11111 | 16004 |
| 39.401 | 77.151 | 8020 | 8338 |
| 39.401 | 77.251 | 5953 | 1077 |
| 39.501 | 77.051 | 21352 | 11874 |
| 39.501 | 77.151 | 18679 | 3747 |
| 39.501 | 77.251 | 16905 | Interior |

Each of the two protected areas in this example is defined by 360 points, and 360 line segments on a Cartesian plot of latitude and longitude (such "line segments" are not straight lines on the surface of the Earth where the protection is applied and for which the distance calculations are performed). Calculations of distances as given in Table 3 above are required by FCC's regulations and represent a minimum distance between any test point and any of the 360 individual points and any of the 360 "line segments" for each protected area, which is an interpretation of the distance calculation $f(x_1,y_1,x_2,y_2)$ described by relation (1) previously.

Given the distances calculated in Table 3 for each individual query location and query channel, the protection requirements for each protected entity (two TV coverage areas in this case) from each query test location might now be verified. Two relevant protection requirements for each television license in the example are the "co-channel protection" and the "adjacent channel protection."

For protected TV coverage areas, with an exemplary method of calculating a protected TV channel contour in the FCC's regulations, the required spacing distances are defined by the height of the antenna of the TVBD and whether or not the TVBD seeks to operate on the co-channel of a TV service or one of the adjacent channels, as given in Table 4:

TABLE 4

| Antenna Height of Unlicensed Device | Required Separation (km) From Digital or Analog TV (Full Service or Low Power) Protected Contour | |
|---|---|---|
| | Co-channel | Adjacent Channel |
| Less than 3 meters | 6.0 km | 0.1 km |
| 3 - Less than 10 meters | 8.0 km | 0.1 km |
| 10-30 meters | 14.4 km | 0.74 km |

The spacing from the two protected areas for the nine test query locations yields the following permitted uses for TVBDs on TV channels 43 and 44 as given in Table 5:

TABLE 5

| Location | | Determination of Permitted TVBD Operation (Described by Antenna Height) | | | |
|---|---|---|---|---|---|
| Latitude | Longitude | Channel 43 | | Channel 44 | |
| (degrees N) | (degrees W) | ("Co"/43) | ("Adj"/44) | ("Adj"/43) | ("Co"/44) |
| 39.301 | 77.051 | None | 10-30 m | 10-30 m | 10-30 m |
| 39.301 | 77.151 | None | 10-30 m | <3 m (40 mW) | 10-30 m |
| 39.301 | 77.251 | None | 10-30 m | <3 m (40 mW) | 3-10 m |
| 39.401 | 77.051 | 3-10 m | 10-30 m | 10-30 m | 10-30 m |
| 39.401 | 77.151 | 3-10 m | 10-30 m | 10-30 m | 3-10 m |
| 39.401 | 77.251 | None | 10-30 m | 10-30 m | None |
| 39.501 | 77.051 | 10-30 m | 10-30 m | 10-30 m | 3-10 m |
| 39.501 | 77.151 | 10-30 m | 10-30 m | 10-30 m | None |
| 39.501 | 77.251 | 10-30 m | <3 m (40 mW) | 10-30 m | None |

In Table 5, the determinative permitted use, the more restricted of the potential uses permitted with respect to each of the two protected services, is shown in bold face. For the simple example of FIG. 8 described herein, permitted use is determined by two protection requirements for two TV services in the vicinity of each location. In practice, many more protected entities and services are likely to be within the vicinity of a given location.

The example for the nine test queries and two 360 point TV channel contours for the two channels in question requires just over 30 msec of CPU time on an Apple MAC Pro computer with 2×2.26 GHz Quad-Core Intel Xeon processor with 16 GB of 1066 MHz memory, using 64 bit Matlab software (version 7.9.0.529 R2009b). This CPU time ignores the database time to retrieve records (across 50 channels in all directions at distances up to 314.4 km). However, 9 locations and 2 protected areas represents 3240 distance calculations, which would be comparable to 1 location and eighteen 360 point TV contours. The number of calculations in this relatively simple example is significantly less than the number of distance calculations required for an actual query in practice.

Approximately 9000 protected TV transmitters operate within the borders of the United States. At a range of 314.4 km, transmitters might be considered within a circular area of roughly 310,000 km² in the basic implementation discussed above. Since the United States has an area of roughly 9,800,000 km², an "average" query might retrieve more than 30 TV protected users (licenses). In densely populated areas such as the Northeast United States, many more TV licenses might be retrieved and many more distance calculations performed. Consequently, a reasonable performance expectation for a WS channel allocation system, with a direct interpretation of the basic calculations, requires server times measured in 10s or 100s of milliseconds per query to account for (i) WS database lookups, (ii) disk reads and (iii) CPU processing.

To improve upon such server times, embodiments of the present invention employ the pre-calculation and storage of query results based on successive resolution tiles for improved query response time, requiring calculations and storage of permitted or prohibited uses over entire areas, while permitting an iterative calculation of available points in real time in response to a current query. Implementation of such calculations, storage and retrieval, described above with respect to FIGS. 5, 6, 7, is now described for the working example.

Considering the single point 39.301° N by 77.051° W (corresponding to 803(9) on the border of protected service 801 of FIG. 8), the spacing requirements for areas around this single point are examined, beginning with a large area and progressively reducing the area of consideration. In practice, the tiles are classified first, the point of interest received with a query as a test location, and the classified tiles having the point of interest searched to satisfy the availability for each channel operating range. However, for the working example, the description herein tracks the point of interest as the tiles of interest of successive resolution are classified.

Figure 10:
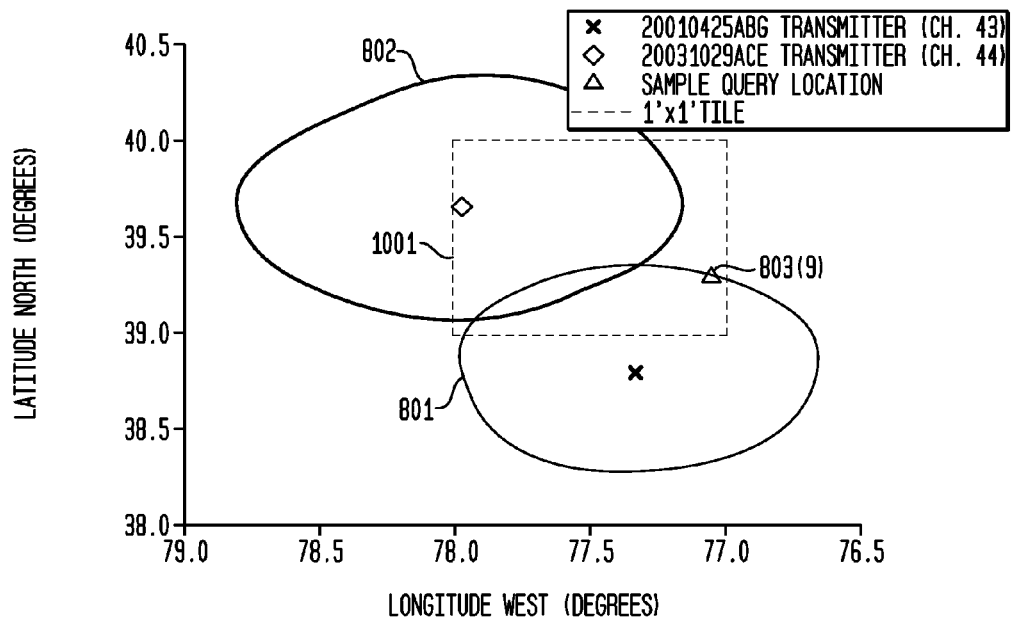
FIG. 10 shows an exemplary 1 degree area bounded on 4 corners in accordance with the example of FIG. 8.

First, consider entire area 1001 bounded on 4 corners located at: 39° N by 77° W, 39° N by 78° W, 40° N by 78° W and 40° N by 77° W, as shown in FIG. 10. The "1 degree tile" 1001 shown encloses the point of interest and overlaps both TV channel contours. As a result, the tile offers no conclusive determination of permitted use on either channel 43 (with respect to the protected service given by the FCC Application ID 20010425ABG) or channel 44 (with respect to the protected service given by the FCC Application ID 20031029ACE). The point itself is not spaced sufficiently from the TV channel 43 contour to allow any use, but it is spaced sufficiently from both TV contours to allow use of a 10-30 m antenna height on channel 44. However, the same conclusion cannot be drawn for the entire 1 degree tile, since the tile is too large to make such a general classification for its entire area. Thus, the "1 degree tile" 1001 shown is unclassified at the first level of resolution with respect to frequency bands or channels related to the operating frequency spectra of channels 43 and 44.

As previously described, protected areas and/or tiles might be defined as a polygon made up of individual points and line segments joining pairs of such individual points. A convenient mathematical definition for such polygon might be as known in the art of TV broadcast analysis, expressed in linear space for latitude and longitude degrees. The linear interpolation between points of a polygon is typically performed between geographic points, which ignoring the true distance between geographic points on the surface of the Earth.

In addition, embodiments of the present invention employ a transformation between geographic coordinates for convenience and to provide ease in addressing tiles, thus creating a form of addressing scheme for the tile search method used by the channel allocation system. For convenience provided by integer values found in the digits of the degree, arc minute, and arc second units, the location coordinates are decomposed for nesting analysis, which nesting analysis is described subsequently. If the query location (x,y) is designated in degrees, arc minutes and arc seconds, as given in relation set (2):

$$x' = \lfloor x \rfloor \in 1$$

$$x' = \lfloor (x-x') \times 60 \rfloor \in 1$$

$$x'' = (x-x'-x') \times 3600 \in R$$

$$y = \lfloor y \rfloor \in 1$$

$$y' = \lfloor (y-y') \times 60 \rfloor \in 1$$

$$y'' = (y-y'-y') \times 3600 \in R \quad (2)$$

then the query location might be decomposed into x°, y°, x', y', x", and y" as digits for geographic resolutions finer than one degree, as given in relation set (3):

$$x'_{10} = \lfloor x'/10 \rfloor \in \{0,1,2,3,4,5\}$$

$$x'_1 = \lfloor x' - (x'_{10} \times 10) \rfloor \in \{0,1,2,3,4,5,6,7,8,9\}$$

$$x'_{10} = \lfloor x''/10 \rfloor \in \{0,1,2,3,4,5\}$$

$$x'_1 = \lfloor x'' - (x'_{10} \times 10) \rfloor \in \{0,1,2,3,4,5,6,7,8,9\}$$

$$y'_{10} = \lfloor y'/10 \rfloor \in \{0,1,2,3,4,5\}$$

$$y'_1 = \lfloor y' - (y'_{10} \times 10) \rfloor \in \{0,1,2,3,4,5,6,7,8,9\}$$

$$y'_{10} = \lfloor y''/10 \rfloor \in \{0,1,2,3,4,5\}$$

$$y'_1 = \lfloor y'' - (y'_{10} \times 10) \rfloor \in \{0,1,2,3,4,5,6,7,8,9\} \quad (3)$$

For an example location 39.1234° N by 105.5678° W, the conversion from decimal values to degrees, arc minutes and arc seconds yields 39° 7'24.24" N and 105° 34'4.08" W. The resulting decomposition is shown in the Table 6:

TABLE 6

| Sample location (decimal degrees) | x°x'x", y°y'y" | (x°, y°) | $(x_{10}', y_{10}')$ | $(x_1', y_1')$ | $(x_{10}", y_{10}")$ | $(x_1", y_1")$ |
|---|---|---|---|---|---|---|
| 39.1234 N 105.5678 W | 39°7'24.24" N 105°34'4.08" W | (39, 105) | (3, 0) | (4, 7) | (0, 2) | (4, 4) |
| 39.7531 N 105.2468 W | 39°45'11.16" N 105°14'48.48" W | (39, 105) | (1, 4) | (4, 5) | (4, 1) | (8, 6) |

An implementation of the above mathematical relationships treats the submitted geographic coordinates as a text data type (either as transmitted to a database or via conversion from a numerical data type within the system once received). Parsing the text or character strings by character and converting to numerical data types would yield the same results as a direct implementation of the equations themselves for numerical data types.

A variation of the addressing scheme uses digits from the decimal degree coordinates, for example, for nesting at increasing resolutions of 100 times at each step. For example, 39.301 N by 77.051 W might be nested using a 1 degree tile referenced to a Southeast corner at 39 N by 77 W, followed by a tile of $\frac{1}{10}^{th}$ of a degree tile (i.e. an area $\frac{1}{10}^{th}$ degree×$\frac{1}{10}^{th}$ degree) referenced from a Southeast corner at 39.3 N by 77.0 W, followed by a $\frac{1}{100}^{th}$ of a degree tile (i.e. an area $\frac{1}{100}^{th}$ degree×$\frac{1}{100}^{th}$ degree) referenced from a Southeast corner at 39.30 N by 77.05 W, etc.

One skilled in the art might employ one or more such variations within degree coordinates to advantage in particular implementations. For example, pre-calculating areas using areas defined as rectangles in units of distance (e.g., 1 km×1 km is also possible), where the tiles are referenced by geographic coordinates of their actual location. This approach is straight forward, but requires recalibration and/or rotation of the tiles from time to time within the resulting grid to compensate for curvature of the Earth.

If an entire 1 degree tile is identically classified over its entire surface for a given TV channel contour, analysis of that TV channel contour at higher resolution (smaller tiles) beginning with step 701 is not necessary. Every point that would ever be queried on such a tile is classified by the large area, stored in database and quickly looked up for the given TV channel on the given area. Depending on the TV channel and geographic location of interest, the size of the area that might be classified (i.e., an area that will yield an identical response to a query with respect to a given channel) varies. In accordance with embodiments of the present invention, larger such areas are classified in entirety wherever possible, and for indeterminate tiles, proceeds to classify smaller areas within the larger tile where necessary, leading to "nesting" of area calculations, as described with respect to step 701.

Figure 11:
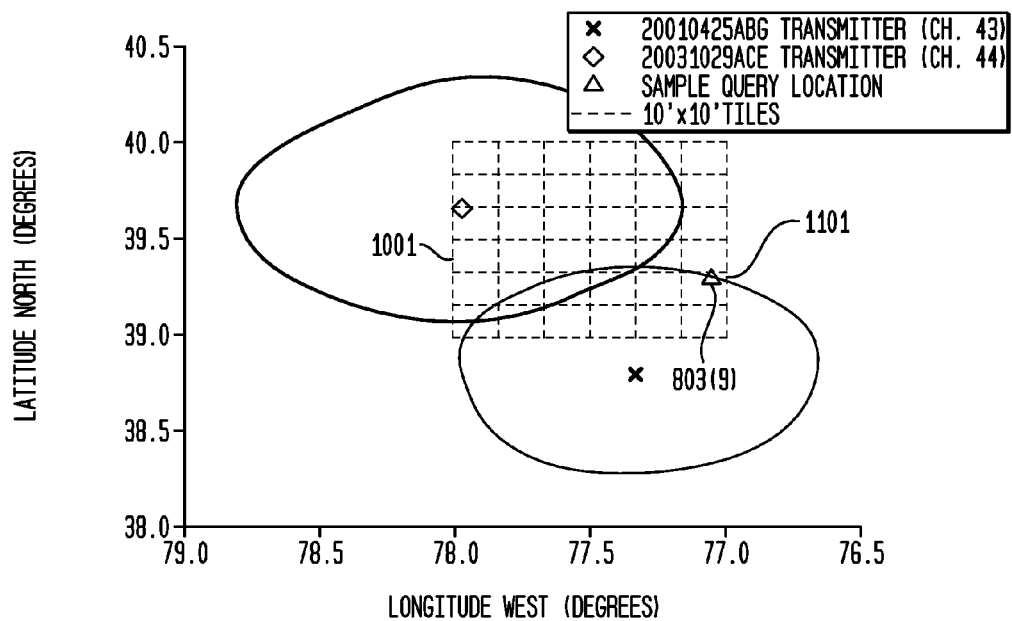
FIG. 11 shows the original 1 degree area of FIG. 10 partitioned into 10 arc minute tiles.

At step 701 of FIG. 7, given the 1 degree tile did not yield a result over the entire such area for either channel, the original 1 degree tile area is partitioned into 10 arc minute by 10 arc minute areas ("10 arc minute tiles"), as shown in FIG. 11. There are 36 such 10 arc minute tiles nested within the original 1 degree tile of interest. The choice of tile size for the example herein is for convenience, since using the digits of the arc minutes within a degree at a resolution of 10 arc minutes yields an integer index for storing the nested areas (i.e., 0, 10, 20, etc.) that are more convenient for data storage than an arbitrary resolution that would yield decimal places within the arc minute units of geographic coordinates. Added convenience is also achieved by nesting at a resolution significantly higher, 36 times higher, for example, than the previous resolution in order to produce a significant likelihood of arriving at a conclusive determination where there was an inconclusive determination at the previously lower resolution.

The point of interest 803(9) in our example (within area 1001) is within 10 arc minute tile 1101 bounded by the corners located at: 39° 10' N by 77° 0' W, 39° 10' N by 77° 10' W, 39° 20' N by 77° 10' W and 39° 20' N by 77° 0' W. The point of interest is 39.301° N by 77.051° W, which transforms to 39° 18' 3.6" N by 77° 3' 3.6" W. This point is selected at such a precision so as to yield a decimal arc second in this transformation, allowing general consideration of this example, without the special case of all integer quantities. The use of the digits from the arc minutes is at an order of magnitude of 10 in the reference of the appropriate 10 arc minute tile. This tile of interest is the second arc 10 minute tile from the bottom edge of the 1 degree tile and the first 10 arc minute tile from the right edge of the 1 degree tile, and, for this example, tiles are referenced from the Southeast corner(s), which are numerically smallest. A magnified view of the tile 1101 having the point of interest C03(9) (as shown in FIG. 11) from among all the 10 minute tiles nested within the original 1 degree tile 1001 is shown in FIG. 12.

As shown in FIG. 12, at higher resolution, individual points of the TV channel contour are clearly identifiable since, for the working example, the TV channel contour has 360 points joined by linear interpolation of the geographic coordinates. This 10 minute tile 1101 is immediately of more interest than the 1 degree tiles since it does not overlap the channel 44 TV contour. Whether the entire tile might yield a result consistent over its entire surface for channel 43 is determined later by postponing the analysis of channel 43 until analysis of channel 44 completes. Once partitioned tile analysis completes at step 701, along with classification storage, at step 702 of FIG. 7, this 10 minute tile 1101 is subject to spacing analysis. Analysis of step 702 begins by considering such possible values for spacing with exclusive boundaries in decreasing order, as illustrated by FIG. 13.

The FCC TV Band Device regulations explicitly include spacing around protected service areas and/or entities at distances of 14.4 km, 8.0 km, 6.0 km, 740 m, and 100 m and 0 m, which are employed as exclusive boundaries for the working example described herein. The bound for the area tested for verifying protection requirements for the working example is created by plotting each exclusive boundary distance around the tile's perimeter in the direction away from the center of the tile keeping the distance line segment perpendicular to the perimeter of the tile of interest along its edges and in a radius from each corner of the tile of interest. Implicitly, a spacing of other distances, considering such protected service entities, such as wireless microphones, temporary Broadcast Auxiliary Service (BAS) links, cable head-end receive sites, protected radio-astronomy locations, international borders etc., exists for other embodiments, but no other spacing requirements exist beyond the protected areas themselves. These regulations describe protected distances around such entities in all or various directions, and these descriptions might be interpreted precisely as protected areas with no additional spacing requirements.

Consequently, exclusive boundaries 1301 and 1302 are plotted around the 10 arc minute tile of interest (e.g., 10 minute tile 1101) based on the spacing requirements. Such exclusive boundaries 1301 and 1302 indicate the boundary of all points in space that lie within a given distance to the nearest point on the 10 arc minute tile. Consequently, any point on or inside the 14.4 km exclusive boundary (the outer line 1302) lie within 14.4 km of at least a single point included on the 10 arc minute tile (including its edge). The 14.4 km exclusive boundary 1302 overlaps the TV channel 44 contour. Therefore, the 10 arc minute tile is not consistently spaced at 14.4 km or more over its entire surface with respect to the channel 43 protected service. However, the 8.0 km exclusive boundary 1301 for the 10 arc minute tile does not overlap the TV channel 44 contour. Therefore, every point on the 10 arc minute tile is spaced at a distance greater than 8.0 km (and greater than 6.0 km, 740 m, 100 m and 0 m, as well) for the entire tile.

Therefore, shown as 1303, the distances from the perimeter of tile F01 of exclusive boundary 1301 is always 8 km. For this TV channel 44 contour, every point on the 10 arc minute tile is spaced at a distance greater than 8.0 km, shown as 1304, and is a first example of a classification over the entire surface of a tile (i.e., for a given area). Thus, this tile can be classified as "available" for channels operating in frequency bands of TV channel 44 with an antenna height of less than 10 m, but not classified for channels operating in frequency bands of TV channel 43. Every point on the 10 minute tile is at least 8.0 km from the exclusive boundary, so any point outside the exclusive boundary is at least 8.0 km spaced from every point within the 10 minute tile. A lack of overlap between this boundary and the channel 44 contour means every point within the protected area for channel 44 is at least 8.0 km from every point in the 10 minute tile.

Considering protected service on TV channel 43 contour, and given the overlap of the tile itself with the channel 43 contour, no uniform classification exists of exclusive spacing for the 10 arc minute tile with respect to the channel 43 protected service contour. The following definitions and terminology describe the classification just illustrated: the TV channel 44 protected service is exclusive to the 10 arc minute tile at a distance of 8.0 km (meaning the lower bound for spacing of every point within the 10 minute tile from the TV channel 44 contour is 8.0 km); there are no exclusive classifications available for the 10 arc minute tile with respect to exclusion of the two protected service areas: channel 44 protection is "excluded" at a distance of 8.0 km for the entire 10 arc minute tile; there is no determinative exclusion of protection requirements for channel 43 for the 10 arc minute tile.

Figure 14:
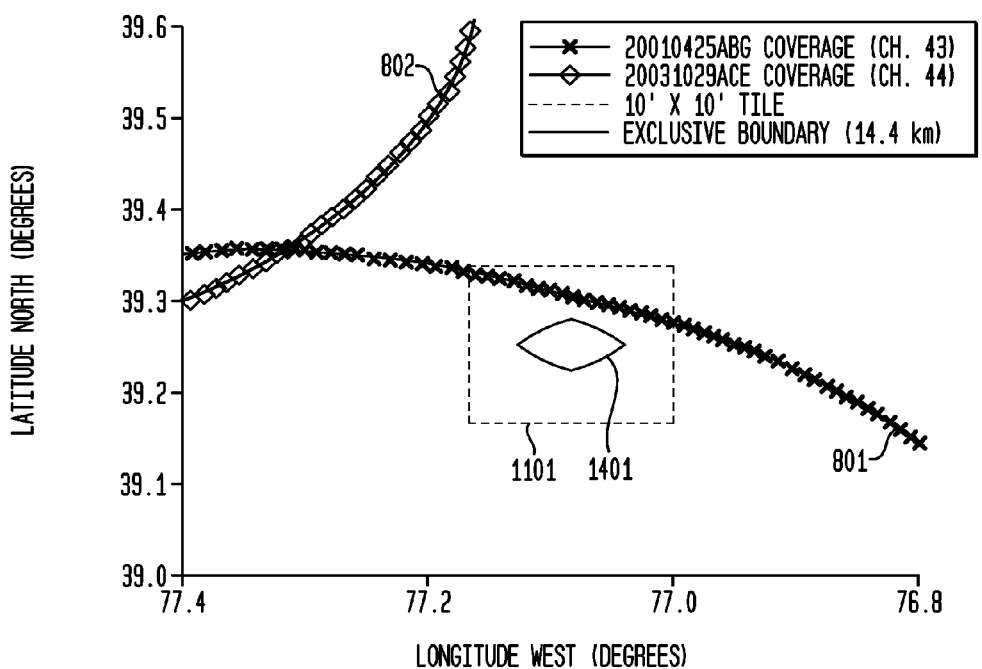
FIG. 14 shows a 14.4 km inclusive boundary around the 10 arc minute tile having the point of interest in FIG. 12.

The exclusive classification at 8.0 km (a lower bound) also forms a test of whether there exists an upper bound of interest on spacing for the entire tile. Consequently, at step 703 of FIG. D, a test determines whether there is a distance of interest for which all points within the 10 arc minute tile are spaced at a distance less than or equal to such a distance of interest. In the case of the working example herein, the upper bound sought, given an exclusive boundary at 8.0 km, is an upper bound of 14.4 km (a classification termed herein as "inclusion"). To clarify the analysis of such an upper bound, an inclusive boundary 1401 is defined, and plotted, as shown in FIG. 14 by plotting the inclusive boundary distance within the tile's perimeter in the direction toward the center of the tile. In this case, however, the inclusive boundaries are formed by intersecting arcs with its radius end point of each arc placed in corresponding corners of the tile of interest, and the radius equivalent to the inclusive boundary distance.

Figure 15:
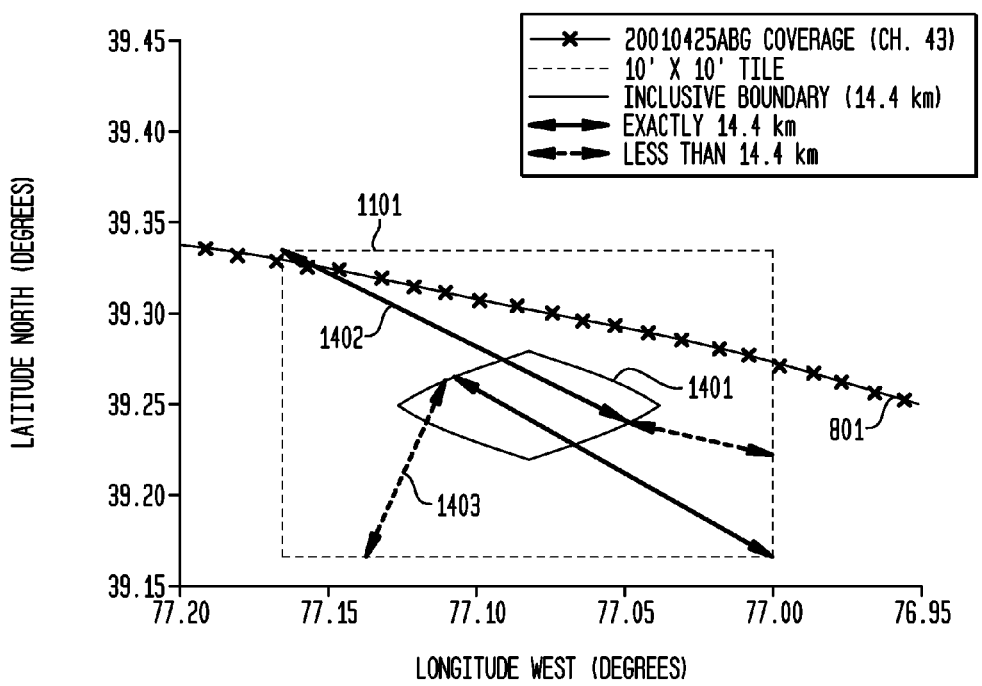
FIG. 15 illustrates the inclusive boundary calculated for distance 14.4 km of FIG. 14.

For every point within inclusive boundary 1401, as calculated for 14.4 km upper bound 1302 in FIG. 13), every point on the 10 arc minute tile is, at most, 14.4 km from any and all points within the inclusive boundary 1401. In this case inclusive boundary 1401 does not overlap the TV channel 44 contour 802, and, thus, does not yield a classification for this tile with respect to the TV channel 44 contour. At the conclusion of step 703, the results of the analysis are again inconclusive at the given resolution of 10 arc minutes. FIG. 15 illustrates the inclusive boundary calculated for distance 14.4 km 1402. Every point within the area enclosed by and including the inclusive boundary is 14.4 km (distance 1402) or less (e.g., distance 1403) from the perimeter of inclusive boundary 1401. Thus, every point within the 10 minute tile area is at most 14.4 km from any and all points within inclusive boundary 1401.

Therefore, at step 704 of FIG. 7, nesting analysis repeats, similar to the process described with respect to steps 701 through 703 (and FIGS. 11 through 15), further, but with successively finer resolution of 1 arc minute. The choice of tile size is again chosen for convenience using the digits of the arc minutes within a degree at a resolution of 1 arc minute, yielding an integer index for storing the nested tile area information. Again, added convenience is achieved by nesting at a resolution significantly higher (e.g., 100 times higher) than the previous resolution in order to produce a significant likelihood of arriving at a conclusive determination where there was an inconclusive determination at the previously lower resolution.

To continue with the working example, step 701 repeats steps 701 through 703 with successively finer resolution of 1 arc minute, further dividing the 10 arc minute tile as illustrated in FIG. 16. The point of interest 803(9) in the example is now found within 1 arc minute tile 1601 bounded by the corners located at: 39° 18' N by 77° 3' W, 39° 18' N by 77° 4' W, 39° 19' N by 77° 4' W and 39° 19' N by 77° 3' W (the desired point of interest is 39° 18' 3.6" N by 77° 3' 3.6" W, and note use of the digits from the arc minutes at an order of magnitude of 1 in the reference of the appropriate 1 arc minute tile.) Thus, in FIG. 16, the point of interest 803(9) is contained within the ninth 1 arc minute tile (tile 1601) from the bottom edge of the 10 arc minute tile and the fourth 1 arc minute tile from the right edge of the arc minute tile (as described previously, in the example herein, tiles are referenced from the Southeast corner(s), which are numerically smallest).

FIG. 17 shows a magnified view of the tile of interest (tile 1601) from among all the 1 arc minute tiles nested within the previous 10 arc minute tile 1101. The higher resolution of the 1 arc minute tile is again compared to the previous 10 arc minute resolution. In this case, however, the entire tile 1601 now appears to lie outside the TV channel 43 contour 801 as well as outside the TV channel 44 contour 802. Analysis proceeds, as illustrated by FIG. 18, by plotting exclusive boundaries at 14.4 km (1801), 8.0 km (1802), 6.0 km (1803), and 0.74 km (1804) around the 1 arc minute tile of interest 1601, similar to the analysis of step 702 as described previously, to consider possible values for spacing in decreasing order.

At 1 arc minute resolution, the TV channel 44 contour 802 is excluded at 14.4 km, (e.g., it is in "white space") since it is beyond the maximum spacing requirement for any degree of protection with respect to channel 44). This is a conclusive result with respect to spacing requirements for TV channel 44 and no further analysis at this resolution or higher resolutions is necessary for TV channel 44. This same conclusion is also immediately available for every point on the 1 arc minute tile of interest. An analysis of any area within the 1 arc minute tile yields the same result and is determined by the preceding analysis with respect to TV channel 44. Thus, the analysis need only be completed once for an infinite number of locations with that area. However, TV channel 43 contour 801 at distances of 14.4 km, 8.0 km or 6.0 km are not excluded at this point. The 740 m exclusive boundary 1804 is ambiguous, as shown in FIG. 18, so a magnified view of 740 m and 100 m exclusive boundaries 1804 and 1805 (not shown in FIG. 18), respectively, is illustrated in FIG. 19. From FIG. 19, the 1 arc minute tile is not excluded at 740 m, but is excluded at 100 m.

Following the example above, the tile of interest might be classified using an inclusive boundary at a spacing distance greater than the excluded boundary. However, no such inclusive boundary exists for this spacing at this resolution. The diagonal distance across the 1 arc minute tile at this latitude is approximately 2.34 km (distance in meters given by degree coordinates varies by latitude in geographic coordinate systems). Therefore, no single point can be within at most 740 m of every point on the 1 minute tile from the definition of the inclusive boundary. Consequently, the nested area analysis of spacing to the TV channel 44 contour 802 is complete, the tile 1601 for the example at this 1 arc minute resolution is classified with respect to TV channel 44 contour 802, and analysis continues at a higher resolution for TV channel 43 contour 801. Therefore, the classification analysis repeats based on the decision at step 704 of FIG. D, and nesting analysis advances to step 701 for TV channel 43 contour 801. The process continues similar to the process previously described, but at successively finer resolution of 10 arc seconds.

At a resolution of 10 arc seconds, again, the choice of tile size is selected for convenience using the digits of the arc seconds within a degree at a resolution of 10 arc seconds, yielding an integer index for storing the nested areas. The increase in resolution from the above 1 arc minute tile analysis to the 10 arc second tile analysis is thus 36 times finer, and is illustrated in FIG. 20.

The point of interest 803(9) in the working example is now found within a 10 arc second tile N01 bounded by the corners located at: 39° 18' 0" N by 77° 3' 0" W, 39° 18' 0" N by 77° 3' 10" W, 39° 18' 10" N by 77° 3' 10" W and 39° 18' 10" N by 77° 3' 0" W, with the original point of interest 803(9) at 39° 18' 3.6" N by 77° 3' 3.6" W. This 10 arc second tile 2001 is the first 10 arc second tile from the bottom edge of the 1 minute tile 1601 of FIG. J and the first 10 arc second tile from the right edge of the 1 arc minute tile 1601. Again, tiles are referenced from the southeast corner(s), which are numerically smallest. A magnified view of the tile of interest 2001 from among all the 10 arc second tiles nested within the previous 1 arc minute tile 1601 is shown in FIG. 21.

As shown in FIG. 22, in a manner analogous to the 1 arc minute tile analysis, exclusive boundaries are plotted at 14.4 km (2201), 8.0 km (2202), 6.0 km (2203), and 0.74 km (2204) around the tile of interest 2001, and the 10 arc second tile 2001 must lie outside the TV channel 43 contour C01 (since the new finer resolution tile was fully contained in the previous coarser resolution tile). At the higher resolution of 10 arc second tile, tile 2001 is small relative to the spacing distances, so as to be barely visible in the center of the exclusive boundaries in FIG. 22. Further analysis of TV channel 44 spacing is not required, since the 1 arc minute (lower) resolution classification is also true at the 10 arc second (higher) resolution (i.e., the TV channel 44 contour 802 is beyond 14.4 km from every point in the arc second tile 2001).

Figure 23:
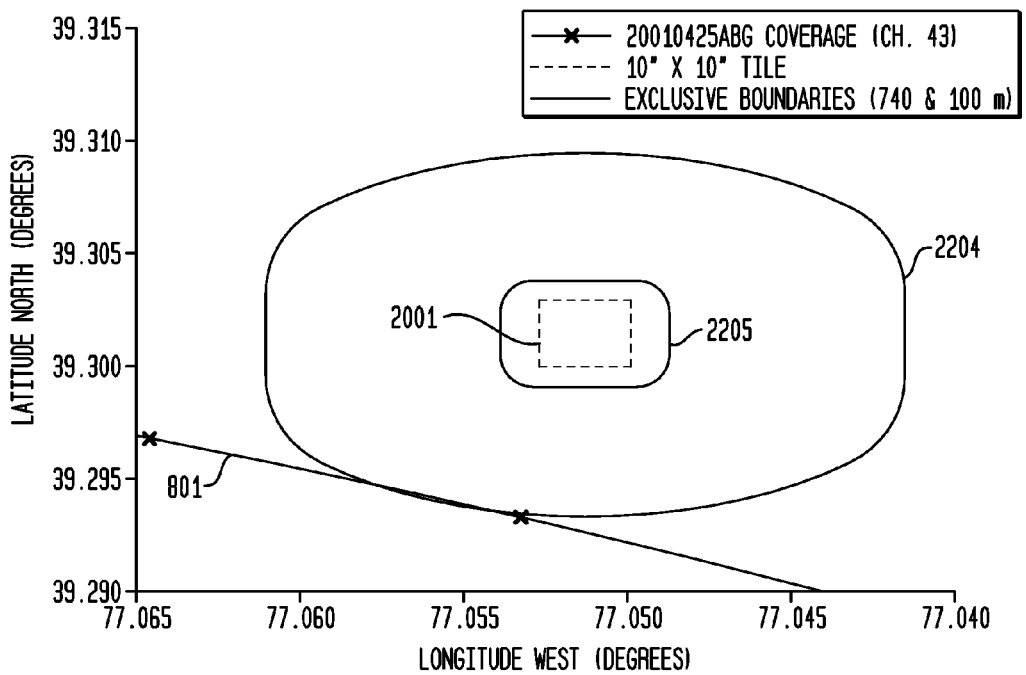
FIG. 23 shows a magnified view of the 740 m and 100 m spacing exclusive boundary area of FIG. 22.

In FIG. 22, exclusive boundaries of 14.4 km (2201), 8.0 km (2202), and 6.0 km (2203) clearly overlap TV channel 43 contour 801. However, the exclusive boundary 2204 at the 740 m spacing appears ambiguous with respect to TV channel 43 contour 801. A magnified view of this area with exclusive boundary 2204 is shown in FIG. 23 with exclusive boundaries 2204 and 2205 (not shown in FIG. 22) shown at spacings of 740 m and 100 m, respectively. As shown in FIG. 23, 740 m exclusive boundary P04 barely overlaps TV channel 43 contour C01, while 100 m exclusive boundary 2205 is clearly outside of TV channel 43 contour 801 for the 10 arc second tile 2001.

Figure 24:
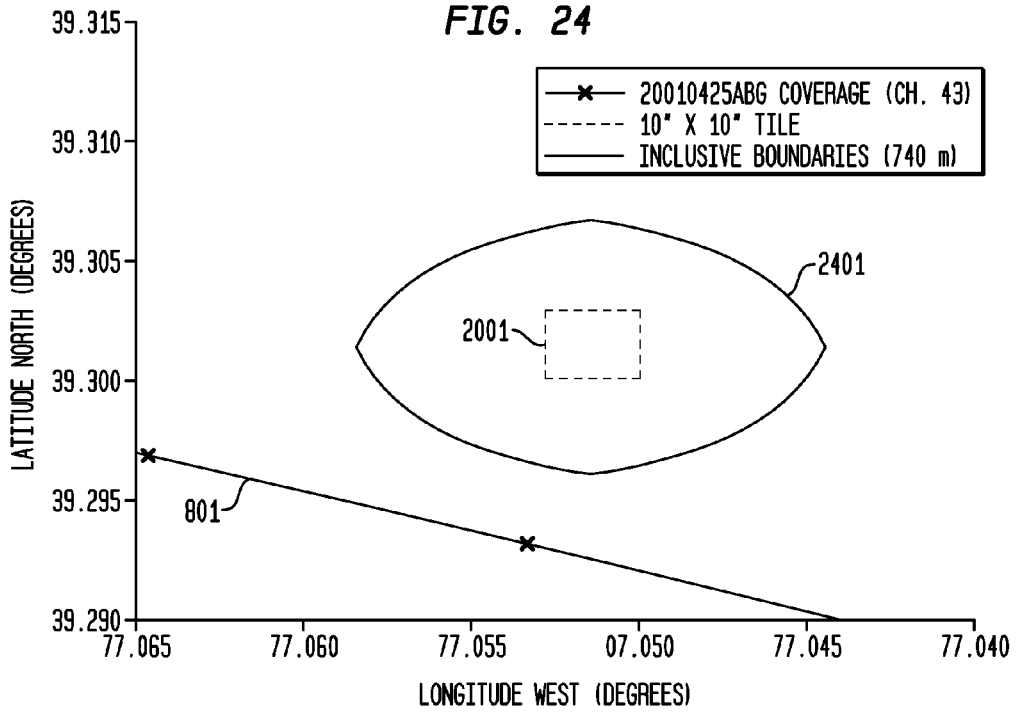
FIG. 24 shows the 740 m spacing of the inclusive boundary around the 10 arc second tile having the point of interest in FIG. 25.
Figure 25:
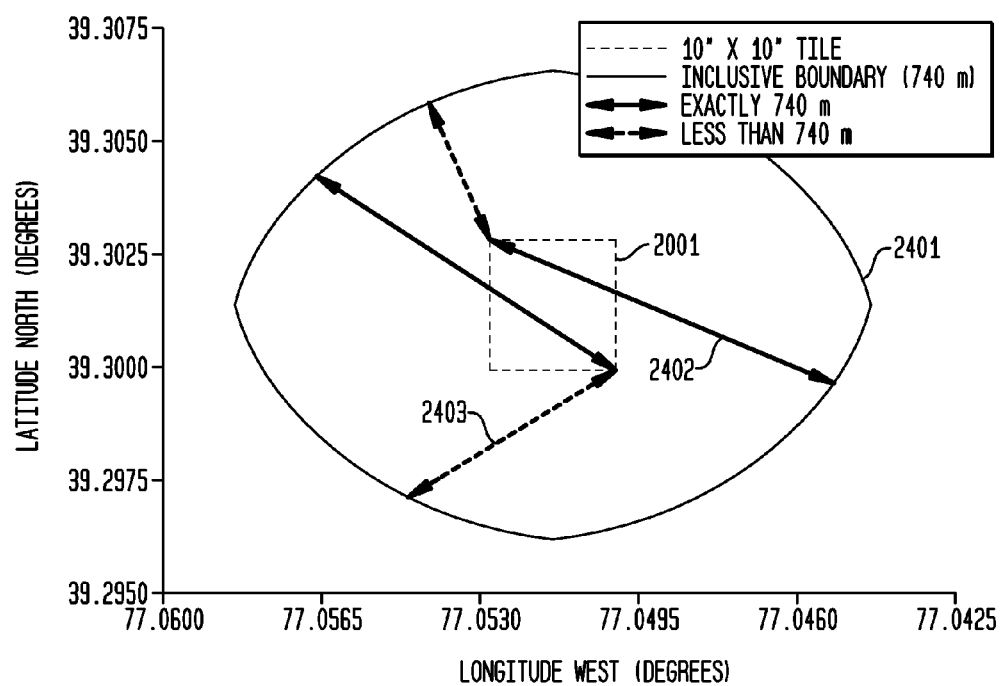
FIG. 25 illustrates plotting of the inclusive boundary around the 10 arc second tile in FIG. 24.

Therefore, analysis proceeds to consider the inclusive boundaries, as shown in FIG. 24 as inclusive boundary 2401 plotted at 740 m spacing, with plotting illustrated more precisely for maximum distance of 740 m (2402) and less (2403) in FIG. 25. Examination of the inclusive boundary with respect to the TV channel 43 contour at a spacing distance greater than the exclusive boundary conclusion is analogous to the analysis with 10 arc minute resolution. Although the method attempts to not overlap a contour with exclusive boundaries at any resolution, inclusive boundary overlap might occur to arrive at a conclusion. Since no overlap exists with the appropriate inclusive boundary and TV channel 43 contour 801, a conclusion does not yet exist, and analysis repeats steps 701, 702, and 703 at a higher resolution with nested 1 arc second tiles.

Figure 26:
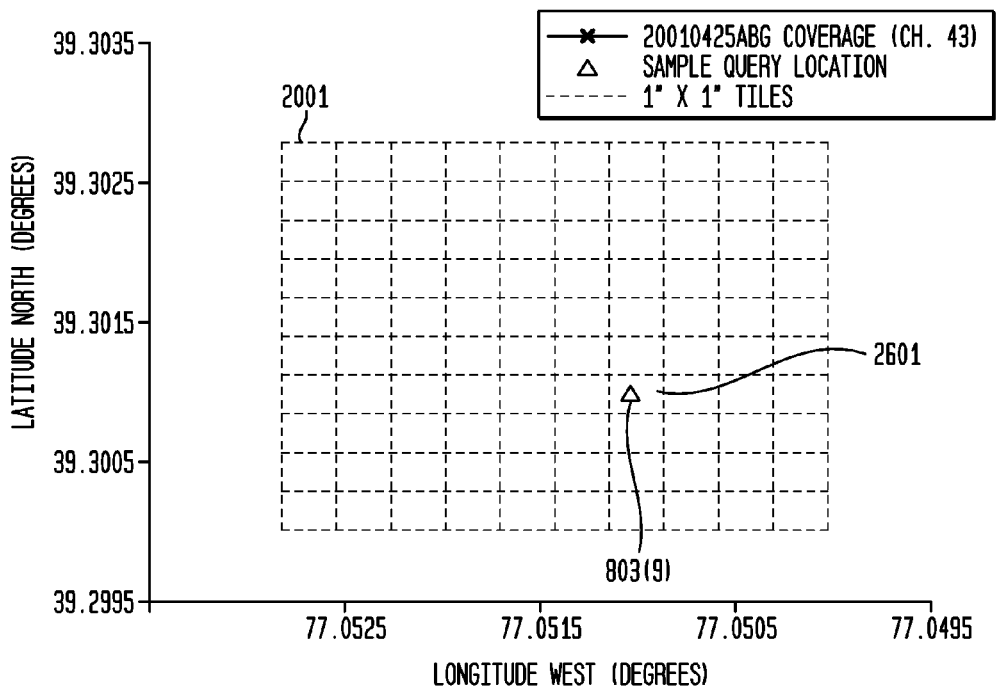
FIG. 26 shows the 10 arc second tile of interest of FIG. 22 partitioned into a nested group of 1 arc second tiles.
Figure 27:
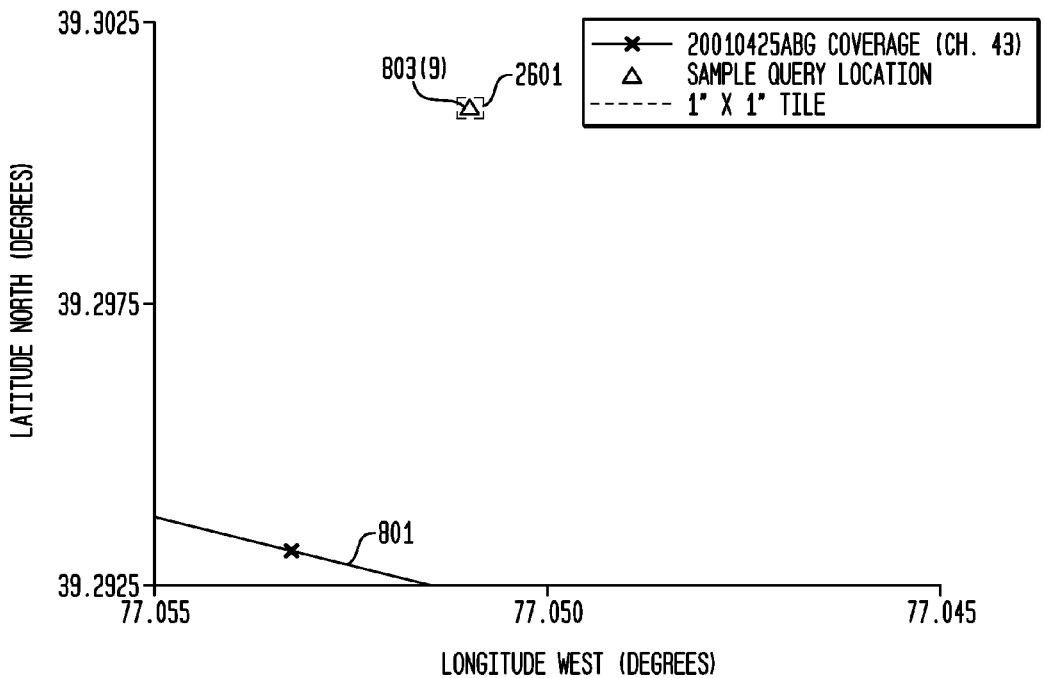
FIG. 27 shows a less magnified view of the tile of interest from among all the 1 arc second tiles nested within the previous 10 arc second tile of FIG. 26 and showing a channel 43 contour.

The increase in resolution from the above 10 arc second tile 2001 analysis to 1 arc second tile of modified is illustrated by partitioning shown in FIG. 26. The point of interest 803(9) is contained within 1 arc second tile 2601 bounded by the corners located at: 39° 18' 3" N by 77° 3' 3" W, 39° 18' 3" N by 77° 3' 4" W, 39° 18' 4" N by 77° 3' 4" W and 39° 18' 4" N by 77° 3' 3" W, with point of interest 803(9) located at 39° 18' 3.6" N by 77° 3' 3.6" W. This 1 arc second tile 2601 is the fourth 1 arc second tile from the bottom edge of the 10 arc second tile 2001 and the fourth 1 arc second tile from the right edge of the 10 arc second tile 2001. Again, tiles are referenced from the Southeast corner(s), which are numerically smallest. A less magnified view of the tile of interest 2601 from among all the 1 second tiles nested within the previous 10 arc second tile 2001 is shown in FIG. 27 in order to bring the channel 43 contour in view within the figure.

As before, step 702 analyzes exclusive boundaries 14.4 km (2801), 8.0 km (2802), 6.0 km (2803) and 0.74 km (2804) about the tile of interest 2601 with respect to the TV channel Inclusive boundary 3001 overlaps TV channel 43 contour 801. The interpretation of this overlap is as follows: some set of points exist inside both TV channel 43 contour 801 and the 6.0 km inclusive boundary 3001, for which all such points every point within the 1 arc second tile is at a distance less than 6.0 km from the TV channel 43 contour. Every point within the 1 arc second tile of interest 2601 is also greater than 740 m from the TV channel 43 contour by the exclusive boundary analysis. Therefore, every point within the 1 arc second tile of interest 2601 is conclusively at a distance between 740 m and 6.0 km from the coverage area of the protected service. At this point, the method of FIG. D stops, with areas of all tiles at each resolution classified as available or unavailable for operating frequencies and spacing distances based on the contours of interest (801 and 802) for TV channels 43 and 44.

The previous example of implementing FIG. 7 for the point of interest 39.301° N by 77.051° W, which transforms to 39° 18' 3.6" N by 77° 3' 3.6" W, might be summarized as follows in Table 7, for exclusion and inclusion results for TV channel 43 and 44 contours, and might be summarized in Table 8 for TVBD operation.

TABLE 7

| Area of Analysis | | Results of Visual Analysis | | | |
|---|---|---|---|---|---|
| | Southeast | Channel 43 | | Channel 44 | |
| Resolution | Reference | Max. Exclusion | Inclusion | Max. Exclusion | Inclusion |
| 1 degree | 39° N 77° W | Null | Null | Null | Null |
| 10 minutes | 39° 10' N 77° 0' W | Null | Null | 8.0 km | Fail (14.4 km) |
| 1 minute | 39° 18' N 77° 3' W | 100 m | Fail (740 m) | 14.4 km | |
| 10 seconds | 39° 18' 0" N 77° 3' 0" W | 100 m | Fail (740 m) | | |
| 1 second | 39° 18' 3" N 77° 3' 3" W | 740 m | Pass (6.0 km) | | |
| Final Result | | 740 m ≦ Spacing ≦ 6.0 km | | White Space (>14.4 km) | |
| Reference Point | | 39° 18' 3" N by 77° 3' 3" W | | 39° 10' N by 77° 0' W | |
| Resolution of Result | | 1 arc second × 1 arc second | | 1 arc minute × 1 arc minute | |

TABLE 8

Figure 30:
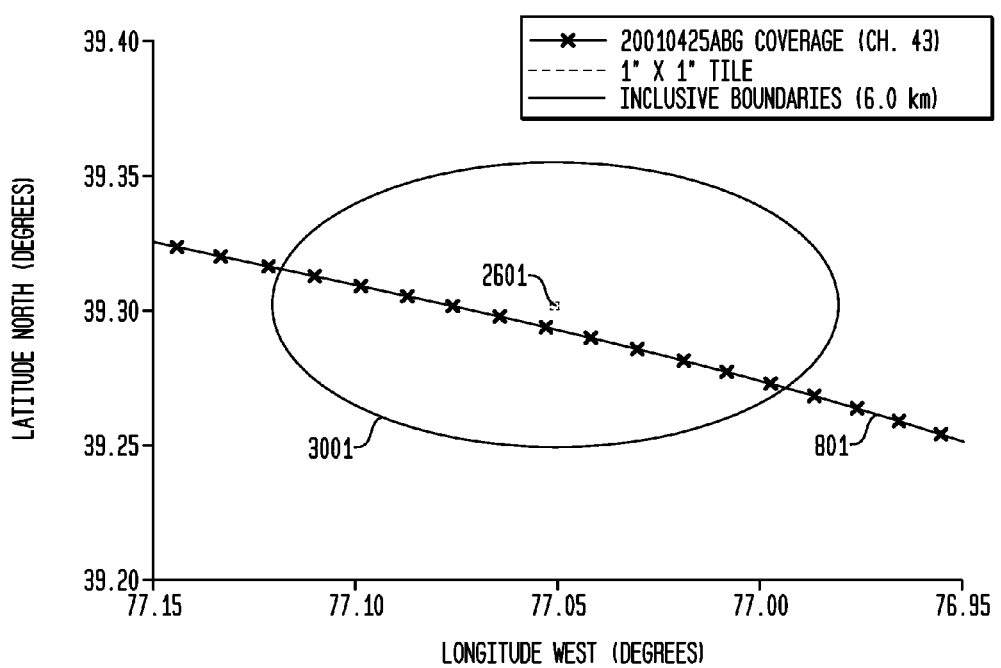
FIG. 30 shows an inclusive boundary at 6.0 km for the 1 arc second tile of interest of FIG. 29.

| Location | | Determination of Permitted TVBD Operation (Described by Antenna Height) | | | |
|---|---|---|---|---|---|
| Latitude | Longitude | Channel 43 | | Channel 44 | |
| (degrees N) | (degrees W) | ("Co"/43) | ("Adj"/44) | ("Adj"/43) | ("Co"/44) |
| 39.301 | 77.051 | None | 10-30 m | 10-30 m | 10-30 m |
| Final Result | | None | | 10-30 m | |
| Resolution of Result | | 1 arc second × 1 arc second | | 1 arc minute × 1 arc minute | | contours (e.g., TV channel 43 contour 801, with result of analysis of TV channel 44 contour 802 already determined) as shown in FIG. 28, and with magnified view shown in FIG. 29. FIGS. 22 and 28 are similar, but exclusive boundaries are plotted around the tile of interest. As shown in FIG. 29, the 740 m spacing exclusive boundary 2804 lies outside channel 43 TV contour 801. (note that the 6.0 km spacing exclusive boundary 2204 of FIG. 22 overlapped TV channel 43 contour 801). Step 703, for 1 arc second resolution, analyzes inclusive boundary 3001 at 6.0 km (the next spacing up from the largest exclusive boundary found to be completely outside TV channel 43 contour 801 of interest), as shown in FIG. 30.

Mobile Remote Device Considerations

As shown in FIG. 1, remote device 114 might communicate wirelessly with WS channel allocation system 100, implying that remote device 114 might be mobile. In such cases, remote device 114 might generate a series of queries as remote device 114 moves across a region in a geographic area. For example, a TVBD might move from one physical location to another with or without continuously transmitting data (e.g., a laptop computer). The TVBD queries the WS channel allocation system each time the TVBD moves from one physical location to another. An example of an implementation of the concept of movement is given by the regulatory requirement to query upon change in position of 100 m as described in paragraph 113 in the FCC "Second Memorandum Opinion and Order." Therefore, for some embodiments herein, the WS channel allocation system employs 1 Arc Second white space mappings for channel allocation, and 3 Arc Second×3 Arc Second mobile device queries. For such embodiments, in addition to transmitting the channel list for the given 1 Arc Second tile having the TVBD, a response to a query also provides the channel lists for the tiles around the given 1 Arc Second tile.

Figure 31:
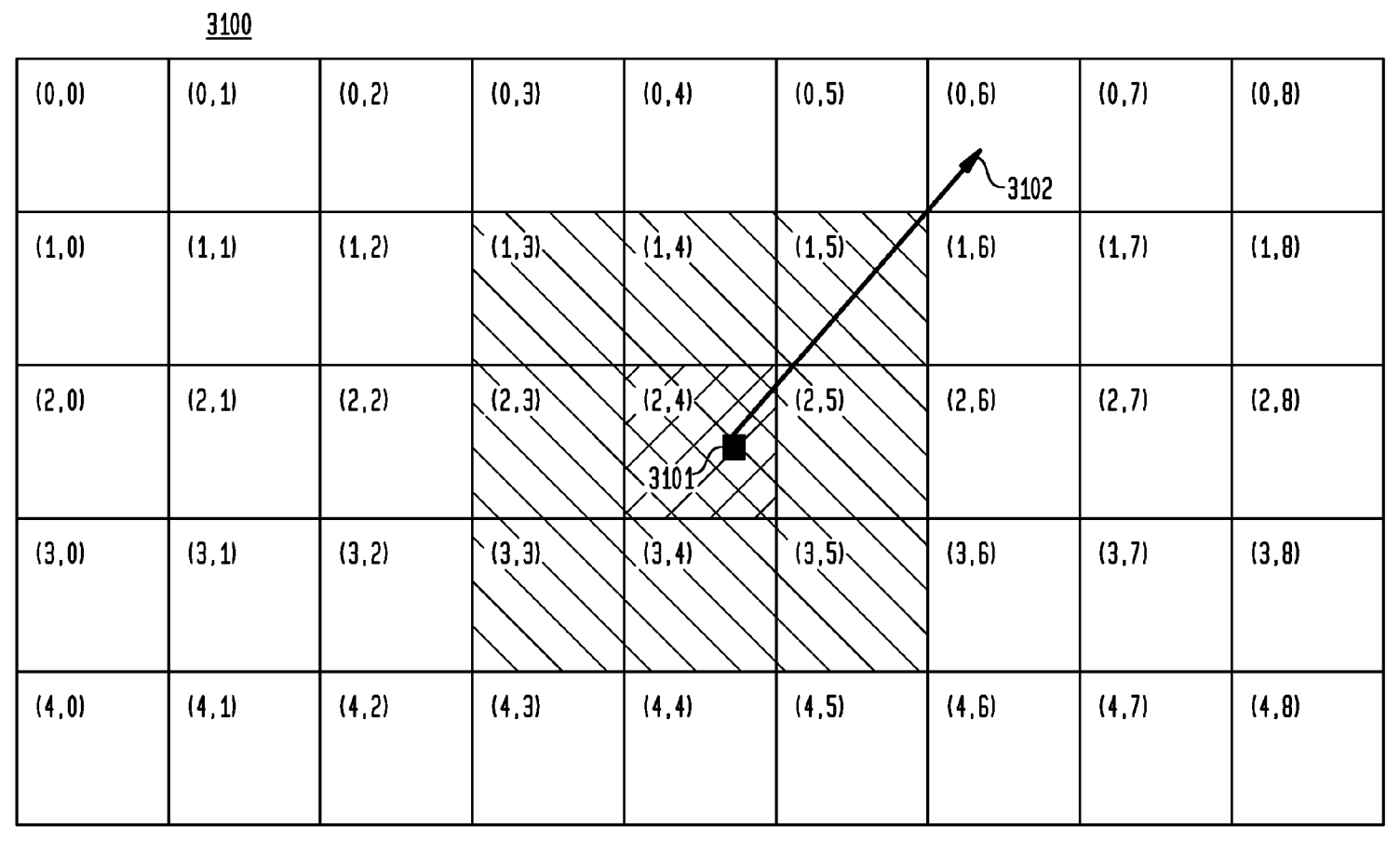

FIG. 31 illustrates mobile device 3101 receiving channel allocations in an area 3100 for its own tile and surrounding tiles in a manner as described above. Area 3100 is divided into tiles of lowest resolution (e.g., 1 arc second tiles) and fully classified with channels either available or unavailable. As shown in FIG. 31, tiles are referenced by their row-column designations (i.e., tile (3,4) is the tile at row 3, column 4 of FIG. 31). Mobile device 3101 requests and receives white space channel allocation for tile (2,4), but also receives channel allocation information in the 3 Arc Second by 3 Arc Second area including this tile at its center. Consequently, mobile device 3101 also receives available channel information or channel lists for tiles (1,3), (1,4), (1,5), (2,3), (2,5), (3,3) (3,4), and (3,5).

In addition, embodiments of the present invention might track velocity, direction and even acceleration of mobile device 3101 through location information. From such tracking information, vector 3102 might be derived and employed to estimate or otherwise predict future reached 1 arc second tiles in a predicted path of mobile device 3101, shown as tiles (2,5), (1,5), and (0,6). While channels allocations for tiles (2,5) and (1,5) will be downloaded to mobile device 3101 as described when receiving channel allocation for tile (2,4), embodiments of the present invention might begin searching tile (0,6) for available channels to increase processing speed as mobile device 3101 moves toward tile (2,5).

Self-Contained Wireless Networking Device Channel Allocation

Figure 32:
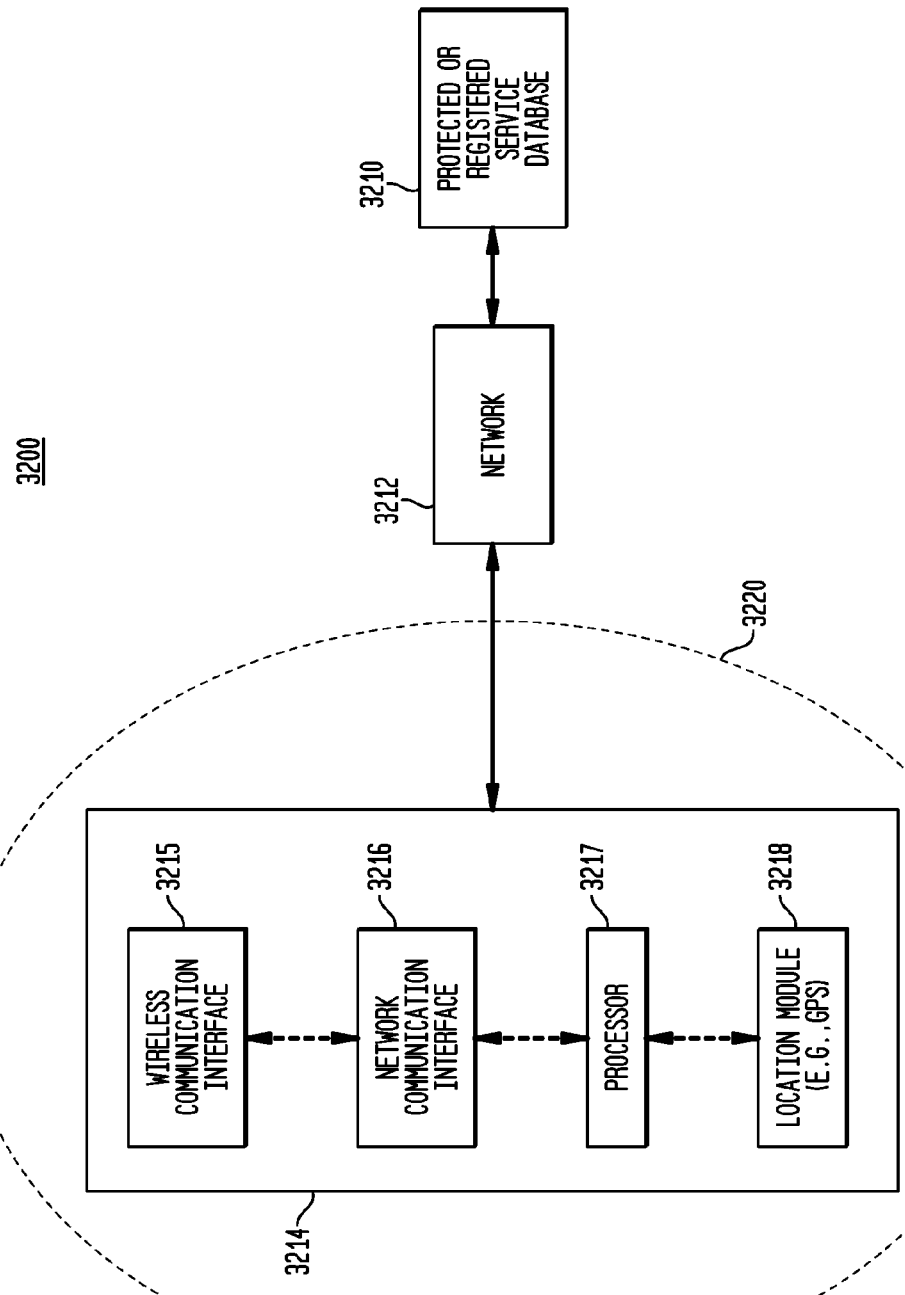
FIG. 32 shows a self-contained networking device determining its channel allocation.

Rather than obtain channel allocations from a remote database, some embodiments of the present invention might access a database to obtain protected service or other registered user communication characteristic information and directly determine channel lists of available channels for communication for itself. FIG. 32 shows an exemplary embodiment of a system 3200 with a self-contained networking device (SCND) 3214 determining its channel allocation. SCND 3214 is coupled to network 3212, which might be the Internet, and communicates with database 3210, which might be a database of protected service or other registered user communication characteristic information. SCND 3214 includes i) wireless network communication interface 3215 to enable communications with various wireless devices near and in communication with SCND 3214; ii) network communication interface 3216 to enable communications with network 3212 and database 3210; iii) processor 3217 to form messages, enable communications, control channel allocation and otherwise enable functions of SCND 3214; and iv) location module 3218, such as a global positioning system (GPS) module, to determine a geographic location of SCND 3214 about the Earth. Processor 3217 represents processor functions including memory or storage that enable execution of a white space allocation similar to that describes previously. Processor 3217, wireless network communication interface 3215, and location module 3218 might also be employed to generate messaging to wireless devices to measure channel characteristics to determine a geographic location of radio coverage 3220 of SCND 3214 about its location.

Figure 33:
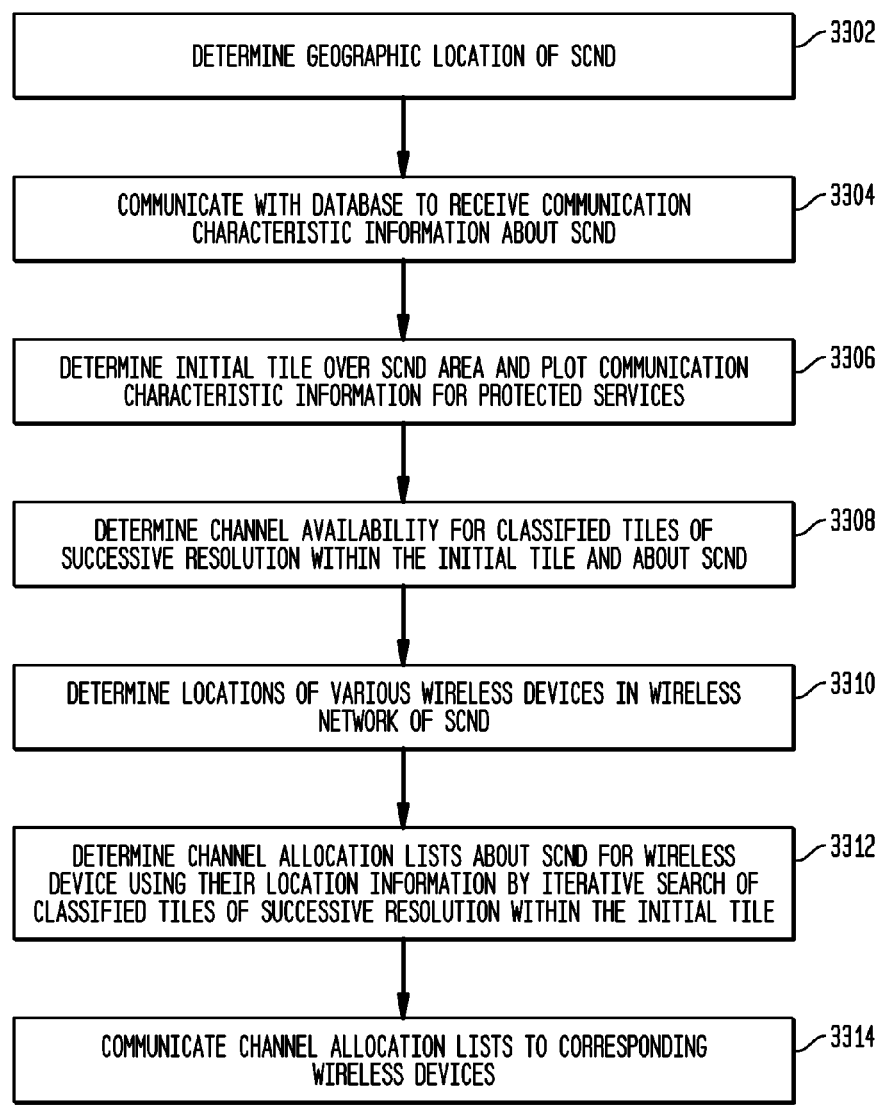
FIG. 33 shows an exemplary method as might be employed by the self-contained networking device of FIG. 32.

FIG. 33 shows an exemplary method as might be employed by the self-contained networking device of FIG. 32. At step 3302, processor 3217 determines it geographic location from location module 3218. At step 3304, processor 3217 causes communication with database 3210 through network communication interface 3216 to receive communication characteristic information about its location. At step 3306, processor 3217 determines an initial tile over its geographic area based on a relative maximum operating range (which might also include interference from wireless devices located at the outside of the coverage area of the SCND). At step 3308, processor 3217 determines channel availability for classified tiles of successive resolution within the initial tile and about SCND 3214. At step 3310, processor 3217 determines locations of various wireless devices near and/or associated with SCND 3214 by, for example, query of the devices. At step 3312, processor 3217 determines channel allocation lists about SCND 3214 for various wireless devices using their location information through an iterative search of the classified tiles of successive resolution within the initial tile. At step 3314, processor 3217, through wireless network communication interface 3215, communicates the channel allocation lists to the corresponding wireless devices associated with SCND 3214.

Message Insertion and Supplemental Content Delivery

In some embodiments of the present invention, a WS channel allocation system might also allow services to obtain identification or other user information of, for example, TVBD users registered with the WS channel allocation system, and then receive message insertion (MI) information from the service for transmission to the TVBD. MI information from the service might identify locations (e.g., servers) having advertising, broadcast or other supplemental content of interest to the TVBD user, and allow the TVBD to formulate requests for such content. The WS channel allocation system might also register these other supplemental content services within its database, providing for secure communication and user-information security, while billing the supplemental content services for such features of the system.

Figure 34:
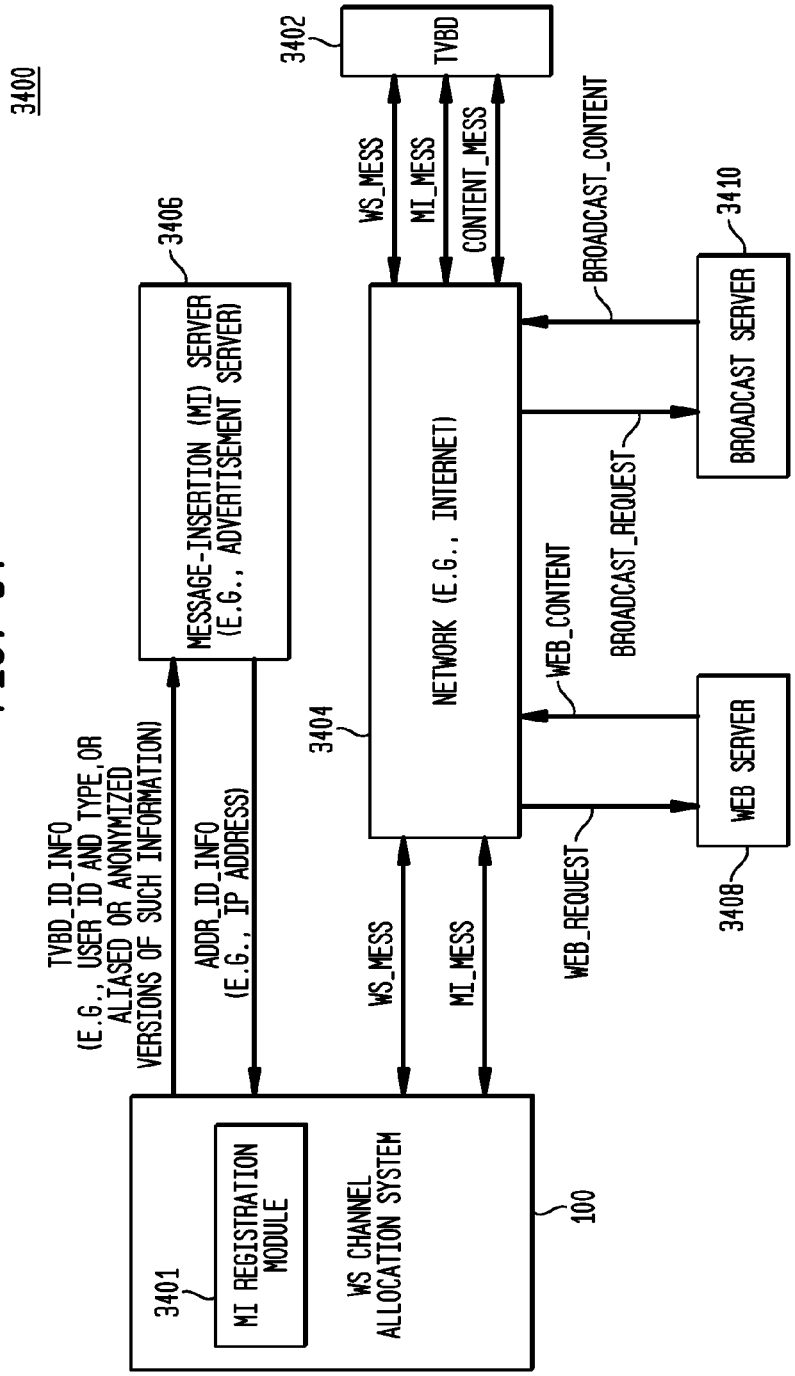
FIG. 34 shows an exemplary configuration for a white space channel allocation system providing for message insertion for TVBDs.

FIG. 34 shows an exemplary configuration 3400 for white space (WS) channel allocation system 100 (FIG. 1) providing for message insertion, such as advertising content, for TVBD 3402 in communication with WS channel allocation system 100 through network (e.g., the Internet) 3404. Message-Insertion (MI) Server 3406 is in communication with WS channel allocation system 100, and WS channel allocation system 100 might further include a MI registration module 3401 for coordinating communication with MI Server 3406. Through network 3404, TVBD 3402 might be in communication with at least one of Web Server 3408 and Broadcast Server 3410.

MI Server 3406 communicates with MI registration module 3401 for registering the MI server in WS channel allocation system 100 for i) security and secure communication with system 100; ii) receiving TVBD or other unprotected service MI-type information (such as, for example, location-specific advertising, user-type sales information, location-specific alarm information, and the like) that MI Server 3406 desires to communicate to TVBD or other unprotected service devices (and thus, device users); and billing and other financial information. Consequently, MI Server 3406 receives TVBD_ID_INFO including user ID and type (e.g., location information) for TVBD 3402 and provides ADDR_ID_INFO including MI-type information (e.g., Web or Broadcast Server IP address information associated with TVBD_ID_INFO) to system 100 for transfer to TVBD 3402. Alternatively, aliased or anonymized such information for TVBD_ID_INFO might be used to protect user privacy.

WS channel allocation system 100 reformats and transmits to TVBD 3402 the MI-type information to TVBD 3402 as MI_Mess channel input data. Note that TVBD 3402 communicates through WS_Mess channel with WS channel allocation system 100, as described previously, for TVBD registration, keep-alive transmissions, and periodic update information including TVBD location and channel lists. Given received ADDR_ID_INFO identifying, for example, IP addresses for Web Server 3408 and/or Broadcast Server 3410 coupled to Network 3404 that might be displayed to the TVBD user, TVBD 3402 initiates communication with at least one of Web Server 3408 and Broadcast Server 3410 through a Content_Mess channel through Network 3404. TVBD 3402 then receives web page or broadcast information from at least one of Web Server 3408 and Broadcast Server 3410 through the Content_Mess channel through Network 3404. For example, TVBD 3402 Content_Mess channel might provide Web_Request to request a Web page defined by ADDR_ID_INFO, or Broadcast_Request to request broadcast information (e.g., radio channel or alerts) defined by ADDR_ID_INFO. Based on these messages, the corresponding Web page (as Web_Content) or broadcast information (as Broadcast_Content) is transmitted back to TVBD 3402 through Network 3404 in the Content_Mess channel.

A channel allocation system operating in accordance with one or more embodiments of the present invention might provide for the following advantages. The channel allocation system provides a data repository, data registration process, and query process as defined by, for example, the FCC to provide allocation and assignment of white space channels in the TV spectrum. Such allocation provides such services without interference to protected users, while expanding the number of channels available to existing and new wireless-based services. Such services, in-turn, benefit from transmission through spectrum with propagation characteristics that allow devices to provide service at greater distance ranges, reduced transmit power, and higher speed than existing unlicensed devices. Service providers can generate white space or other channel information relatively quickly, requiring significantly reduced server computation time when responding to a query by a device, in order to reduce cost and improve efficiency of providing the service.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary.

Likewise, additional steps may be included in such methods, and certain steps may be omitted or combined, in methods consistent with various embodiments of the present invention. Consequently, although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method of allocating communication channels within a geographic area having protected classes of service, the method comprising:
   generating, based on communications characteristics from storage, protected service contours over the geographic area for one or more of the protected classes of service;
   partitioning a region over the geographic area into unclassified tiles at a first level of resolution;
   classifying, by a processor, each unclassified tile, if able, for availability of channels with respect to each protected service contour of the region associated with the tile at the first level of resolution; and
   if the corresponding unclassified tile is not classified,
      dividing each unclassified tile into nested tiles of one or more subsequent levels of finer resolution, and
      forming nested, classified tiles of successive levels of resolution by classifying, if able, each tile at the subsequent level of finer resolution with respect to each protected service contour of the region associated with the corresponding tile at the subsequent level.

2. The method of allocating communication channels as recited in claim 1, wherein, if the corresponding unclassified tile is not classified, comprising:
   for each unclassified tile at a current level of resolution:
      (a) nested partitioning of the unclassified tile at the current level of resolution into tiles at a successive level of finer resolution;
      (b) classifying, if able, each tile at the successive level of finer resolution based upon availability of channels with respect to each corresponding protected service contour of the region;
      (c) further classifying, if able, each unclassified tile at the successive level of finer resolution with respect to each corresponding protected service contour of the region and at least one of an exclusive boundary and an inclusive boundary of the unclassified tile at the successive level of finer resolution; and
      (d) repeating (a) through (c) at successive, finer levels of resolution until specifying channel availability of the region with nested, classified tiles of successive levels of resolution.

3. The method of claim 1, further comprising:
   receiving, from a device, a query having a location and one or more desired channels of operation corresponding to the query location;
   identifying, beginning with the first level and searching successive levels of the nested, classified tiles of successive levels of resolution, a classified tile classified as available for the query location based on the one or more desired channels of operation; and
   allocating channels, if available, associated with the identified, classified tile with the query location to a channel list.

4. The method of claim 3, further comprising transmitting the channel list to the device.

5. The method of claim 4, wherein for the transmitting of the channel list to the device, the device belongs to an unprotected class of service.

6. The method of claim 4, wherein for the transmitting of the channel list to the device, the device is at least one of i) a television band device (TVBD) of a white space channel allocation system and ii) a wireless handset of a femtocell communication system.

7. The method of claim 4, wherein for the transmitting of the channel list to the device, the device is a mobile device and the method further comprises transmitting channel lists for tiles adjacent to the identified, classified tile.

8. The method of claim 7, wherein for the transmitting of the channel list to the device, the identified, classified tile is a one arc-second tile and the method comprises transmitting channel lists for one arc-second tiles adjacent to the identified, classified tile.

9. The method of claim 4, further comprising registering a new protected service, and updating the nested, classified tiles of successive levels of resolution for one or more contours of the new protected service.

10. The method of claim 9, further comprising updating the channel list for the device, and transmitting the updated channel list to the device.

11. The method of claim 3, wherein the partitioning the region comprises translating geographic coordinates, and wherein the method further comprises
   forming an addressing scheme for the nested, classified tiles of successive levels of resolution based on the translated geographic coordinates;
   associating the query location with a corresponding point in the translated geographic coordinates of the addressing scheme; and
   searching the nested, classified tiles of successive levels of resolution based on the translated geographic coordinates of a point corresponding to the query location.

12. The method of claim 1, wherein the classifying each tile at a level of resolution comprises:
   verifying protected service requirements for a corresponding protected service contour; and
   storing data, based on the verifying of the protected service requirements, of whether corresponding channels of the tile are available or unavailable.

13. The method of claim 1, wherein the classifying, if able, each unclassified tile at the subsequent level of finer resolution comprises:

forming an exclusive boundary area for each exclusive boundary outside a perimeter of the tile, the exclusive boundary defined by a spacing distance;

verifying, for the exclusive boundary area, protected service requirements for each corresponding protected service contour; and storing, based on the verifying of the protected service requirements for the exclusive boundary area, availability of corresponding channels of the tile.

14. The invention of claim 13, wherein, for the forming of the exclusive boundary area, each spacing distance corresponds to a protected distance from a non-protected service class transmitter.

15. The method of claim 1, wherein the classifying, if able, of each unclassified tile at the subsequent level of finer resolution comprises:

forming an inclusive boundary area for each inclusive boundary inside a perimeter of the tile, the inclusive boundary defined by a corresponding spacing distance;

verifying, for the inclusive boundary area, protected service requirements for each corresponding protected service contour; and storing, based on the verifying of the protected service requirements for the inclusive boundary area, availability of corresponding channels of the tile.

16. The method of claim 15, wherein, for the forming the inclusive boundary area, the corresponding spacing distance is a maximum spacing distance for an exclusive boundary.

17. The method of claim 1, wherein the generating the protected service contours comprises forming a protected area with a polygon.

18. The method of claim 17, wherein the forming the protected area comprises:

defining the protected area by N geographic points from 0 to 359 degrees at M azimuths from 0 to 359 degrees from a center emitter, where N and M are positive integers;

connecting lines are drawn in a Cartesian plane of latitudes or longitudes between adjacent geographic points;

combining sample points with linear interpolation into a contour about the protected area over a surface area on an ellipsoidal (geodetic) model of the Earth's surface.

19. The method of claim 17, further comprising allocating white space communication channels to one or more unprotected classes of service, wherein the plurality of protected classes of service includes TV broadcast stations, and the one or more unprotected classes of service includes TV band devices (TVBDs).

20. The method of claim 19, wherein the allocating of white space communication channels comprises:

receiving, from a TVBD, a query having a location and one or more desired channels of operation corresponding to the query location;

identifying, beginning with the first level and searching successive levels of the nested, classified tiles of successive levels of resolution, a classified tile classified as available with the query location based on the one or more desired channels of operation;

allocating, if available, white space channels associated with the identified, classified tile with the query location to channel list; and transmitting the channel list to the TVBD.

21. The method of claim 1, wherein the partitioning the region comprises translating geographic coordinates, and wherein the method further comprises forming an addressing scheme for the nested, classified tiles of successive levels of resolution based on the translated geographic coordinates.

22. The method of claim 1, further comprising:

receiving a message from a new protected service class device, the message including communication characteristics for the new protected service class device;

generating a new protected service contour based on the communication characteristics for the new protected service class device; and updating the nested, classified tiles of successive levels of resolution based on the new protected service contour.

23. A machine-readable, non-transitory, storage medium, having encoded thereon program code, wherein, when the program code is executed by a machine, the machine implements a method for allocating communication channels within a geographic area having protected classes of service, comprising the steps of:

generating, based on communications characteristics from storage, protected service contours over the geographic area for one or more of the protected classes of service;

partitioning a region over the geographic area into unclassified tiles at a first level of resolution;

classifying each unclassified tile, if able, for availability of channels with respect to each protected service contour of the region associated with the tile at the first level of resolution; and if the corresponding unclassified tile is not classified, dividing each unclassified tile into nested tiles of one or more subsequent levels of finer resolution, and forming nested, classified tiles of successive levels of resolution by classifying, if able, each tile at the subsequent level of finer resolution with respect to each protected service contour of the region associated with the corresponding tile at the subsequent level.

24. The machine-readable, non-transitory, storage medium as recited in claim 23, wherein, if the corresponding unclassified tile is not classified, comprising the steps of:

for each unclassified tile at a current level of resolution:

(a) nested partitioning of the unclassified tile at the current level of resolution into tiles at a successive level of finer resolution;

(b) classifying, if able, each tile at the successive level of finer resolution based upon availability of channels with respect to each corresponding protected service contour of the region;

(c) further classifying, if able, each unclassified tile at the successive level of finer resolution with respect to each corresponding protected service contour of the region and at least one of an exclusive boundary and an inclusive boundary of the unclassified tile at the successive level of finer resolution; and (d) repeating (a) through (c) at successive, finer levels of resolution until specifying channel availability of the region with nested, classified tiles of successive levels of resolution.

25. Apparatus for allocating communication channels within a geographic area having protected classes of service, comprising:

a database interface configured to retrieve communications characteristics for the plurality of protected classes of service from a database, the database further including i) communications characteristics for a plurality of protected classes of service, and ii) registration information for one or more devices belonging to one or more classes of unprotected service;

a processor configured to i) generate, based on communications characteristics from the database, protected service contours over the geographic area for one or more of the protected classes of service, ii) partition a region over the geographic area into unclassified tiles at a first level of resolution, and classify each unclassified tile, if able, for availability of channels with respect to each protected service contour of the region associated with the tile at the first level of resolution, wherein, if the corresponding unclassified tile is not classified, the processor is further configured to:
- i) divide each unclassified tile into nested tiles of one or more subsequent levels of finer resolution, and
- ii) form nested, classified tiles of successive levels of resolution by classifying, if able, each tile at the subsequent level of finer resolution with respect to each protected service contour of the region associated with the corresponding tile at the subsequent level; and wherein the processor stores the nested, classified tiles of successive levels of resolution in the database.

26. The apparatus as recited in claim 25, wherein, if the corresponding unclassified tile is not classified, the processor, for each unclassified tile at a current level of resolution, is further configured to:
- (a) nested partition the unclassified tile at the current level of resolution into tiles at a successive level of finer resolution;
- (b) classify, if able, each tile at the successive level of finer resolution based upon availability of channels with respect to each corresponding protected service contour of the region;
- (c) further classify, if able, each unclassified tile at the successive level of finer resolution with respect to each corresponding protected service contour of the region and at least one of an exclusive boundary and an inclusive boundary of the unclassified tile at the successive level of finer resolution; and
- (d) repeat (a) through (c) at successive, finer levels of resolution until specifying channel availability of the region with nested, classified tiles of successive levels of resolution.

* * * * *